(12) United States Patent
Furuichi et al.

(10) Patent No.: US 7,936,356 B2
(45) Date of Patent: May 3, 2011

(54) INFORMATION PROCESSING METHOD FOR INFORMATION REGISTRATION, AND INFORMATION PROCESSING METHOD FOR INFORMATION RETRIEVAL

(75) Inventors: Sanehiro Furuichi, Kawasaki (JP); Susumu Shimotono, Hadano (JP); Tetsuya Noguchi, Tokyo-to (JP); Jun Sugiyama, Yamatao (JP); Hassan Hajji, Yamato (JP)

(73) Assignee: International Business Machines Corporation, Armonk, NY (US)

( * ) Notice: Subject to any disclaimer, the term of this patent is extended or adjusted under 35 U.S.C. 154(b) by 651 days.

(21) Appl. No.: 10/985,707

(22) Filed: Nov. 10, 2004

(65) Prior Publication Data
US 2005/0122336 A1    Jun. 9, 2005

(30) Foreign Application Priority Data
Nov. 10, 2003  (JP) ................................ 2003-379831

(51) Int. Cl.
*G06T 1/00* (2006.01)
*G06T 15/00* (2006.01)

(52) U.S. Cl. ........ 345/522; 345/501; 345/502; 345/503; 345/504; 345/505; 345/506; 345/519; 715/704; 715/709; 715/731; 715/762; 715/863; 709/203; 709/204

(58) Field of Classification Search .......... 345/501–506, 345/519–522; 715/704, 709, 731, 762, 863; 707/6, 7
See application file for complete search history.

(56) References Cited

U.S. PATENT DOCUMENTS

| | | | | |
|---|---|---|---|---|
| 4,829,294 | A * | 5/1989 | Iwami et al. .................. | 715/803 |
| 6,340,977 | B1 * | 1/2002 | Lui et al. ....................... | 715/709 |
| 6,546,397 | B1 * | 4/2003 | Rempell ....................... | 707/102 |
| 7,185,286 | B2 * | 2/2007 | Zondervan et al. .......... | 715/762 |
| 7,206,788 | B2 * | 4/2007 | Horvitz et al. ............... | 707/102 |
| 7,225,244 | B2 * | 5/2007 | Reynolds et al. ............ | 709/223 |
| 2002/0118220 | A1 * | 8/2002 | Lui et al. ....................... | 345/709 |
| 2002/0198939 | A1 * | 12/2002 | Lee et al. ....................... | 709/203 |
| 2003/0142344 | A1 * | 7/2003 | Geske et al. ................. | 358/1.15 |
| 2004/0215719 | A1 * | 10/2004 | Altshuler ...................... | 709/204 |
| 2005/0034083 | A1 * | 2/2005 | Jaeger .......................... | 715/863 |
| 2005/0068549 | A1 * | 3/2005 | Jaeger .......................... | 358/1.2 |
| 2005/0071760 | A1 * | 3/2005 | Jaeger .......................... | 715/705 |
| 2005/0071764 | A1 * | 3/2005 | Jaeger .......................... | 715/731 |

FOREIGN PATENT DOCUMENTS

| | | |
|---|---|---|
| JP | 09-034844 | 2/1997 |
| JP | 10-222689 | 8/1998 |
| JP | 11-288439 | 10/1999 |
| JP | 2000-029592 | 1/2000 |
| JP | 2000-163602 | 6/2000 |
| JP | 2002-182811 | 12/2000 |

* cited by examiner

*Primary Examiner* — Jin-Cheng Wang
(74) *Attorney, Agent, or Firm* — Richard M. Goldman; Shimokaji & Associates, P.C.

(57) ABSTRACT

An information processor for information registration, capturing means captures a graphics processing command, and database registering means registers, as information about completed work in the database, information about a series of graphics processing commands concerning completed works out of the captured graphics processing commands. In an information processor for information retrieval, proceeding work detecting means detects a work in progress as a proceeding work based on the captured graphics processing command, and information acquiring means searches a database for the information about the work in progress which has been done before based on the graphics processing command concerning the proceeding work and acquires the information about the work in progress which has been done before.

26 Claims, 18 Drawing Sheets

Figure 6

INFORMATION PROCESSING METHOD FOR INFORMATION REGISTRATION, AND INFORMATION PROCESSING METHOD FOR INFORMATION RETRIEVAL

BACKGROUND

1. Field of the Invention

The present invention relates to an information processing system, an information processor for information registration, an information processor for information retrieval, an information processing method for information registration, an information processing method for information retrieval, a program, and a recording medium whereby rationalization is achieved for a common work performed by users who use the information processors in a group.

2. Background Art

When a PC (personal computer) user cannot specifically find what settings to make for application software and a shared printer, a typical solution is to refer to the corresponding manual or reference or online help or to refer to questions and answers on a web page provided by the vendor of the application software. However, it takes manpower and time to locate a desired description and determine a proper setting. Some kinds of application software have default settings. When such default settings are not available or a unique setting is necessary for the group of the user, the user has to make the setting by him/herself.

In the device and method of Japanese Published Unexamined Patent Application No. 2000-29592, when a plurality of client terminals and an image scanner shared by the terminals are connected to a LAN, the set value of the shared image scanner is registered in a parameter setting file server. When the shared image scanner is used by the terminals, the set value registered beforehand in the parameter setting file server is used to avoid complicated settings of the terminals.

In the device and method of Japanese Published Unexamined Patent Application No. 2002-182811, each window displayed by application software is provided with an ID. When a user gets stuck in the operations of the window, the ID is used as a search key to search a support DB (database) on a network, so that the latest support information about the window can be read.

In the device and method of Japanese Published Unexamined Patent Application No. 9-34844, regarding the settings of environment information shared by PCs connected to one another via a network, a predetermined person in charge sets environment information ahead of other users in a group and stores the information. The users follow the environment information set by the person in charge, so that the users rationally make the settings on their PC.

In the device and method of Japanese Published Unexamined Patent Application No. 11-288439, the processing history information of users and a group is accumulated. In response to an input of a predetermined user, the processing history information associated with the user is used along with the processing history information of the user, so that proper processing is performed.

Application software and shared resources used by a user are not always used by the overall group. Some kinds of software and shared resources are only used by some users. For example, graphics software is not necessarily used by all the members of the group and thus the kind of graphic software to use is not determined in the group. Hence, some members in the group may use graphics software from company A and others may use graphics software from company B. Further, even after a new version of word processing software is released, just a few members may have installed the new version. When each version of each kind of application software requires a plurality of settings, even the same setting results in an enormous number of setting operations in the group. When a person in charge performs all the setting operations ahead of others and registers the setting data in a database, the load of the person in charge is increased and it becomes difficult to immediately release the setting data of the setting operations to the group members.

In the device and method of Japanese Published Unexamined Patent Application No. 2000-29592 and Japanese Published Unexamined Patent Application No. 9-34844, since a predetermined person in charge registers a set value specific to the group beforehand, the above problem cannot be solved. Japanese Published Unexamined Patent Application No. 2002-182811 just discloses an efficient retrieving method associated with a predetermined window. Moreover, Japanese Published Unexamined Patent Application No. 11-288439 just discloses that the processing history of a user is caused to remain and past processing history is used when the user makes access again later.

On the other hand, in a group, different users at different PCs may perform a work having the same series of operations, in addition to the setting operation. In this case, when the subsequent user can find the operation contents of the preceding user, efficiency may improve.

Therefore, a clear need exists to provide an information processing system, an information processor for information registration, an information processor for information retrieval, an information processing method for information registration, an information processing method for information retrieval, a program, and a recording medium that are useful as a basis (infrastructure) for swiftly registering the information about a common work in a database when a user completes the common work ahead of others in a group, and for swiftly providing information from the database when the user requests information about a proceeding work.

SUMMARY OF THE INVENTION

An information processing system of the present invention has an information processor for information registration and an information processor for information retrieval. The information processor for information registration has capturing means for capturing a graphics processing command to a graphics interface from started application software and database registering means for registering, as information about completed work in a database, information about a series of graphics processing commands concerning a completed work out of the captured graphics processing commands. The information processor for information retrieval has capturing means for capturing a graphics processing command to a graphics interface from started application software, proceeding work detecting means for detecting a work in progress as a proceeding work based on the captured graphics processing command, information acquiring means which searches a database for the information about the work in progress which has been done before based on a graphics processing command concerning the proceeding work and acquires the information about the work in progress which has been done before, and information using means for using the information about completed work, which has been acquired by the information acquiring means, for the proceeding work. Another information processor for information retrieval of the present invention has graphics object information detecting means for detecting information about a graphics object which concerns a use request for information about completed work about a proceeding work from the user, information acquiring means which searches a database based on a detected object for the information about the work in progress which has been done before and acquires the information about the work in progress which has been done before, and information using means for using the information about completed work, which has been acquired by the information acquiring means, for the proceeding work.

An information processing method for information registration of the present invention has a first step of capturing a graphics processing command to a graphics interface from started application software, and a second step of registering, as information about completed work in a database, information about a series of graphics processing commands concerning a completed work out of the captured graphics processing commands.

An information processing method for information retrieval of the present invention has a third step of capturing a graphics processing command to a graphics interface from started application software, a fourth step of detecting a work in progress as a proceeding work based on the captured graphics processing command, a fifth step of searching a database for the information about the work in progress which has been done before based on the graphics processing command concerning the proceeding work and acquiring information about the work in progress which has been done before, and a sixth step of using the acquired information about completed work for the proceeding work. Another information processing method for information retrieval of the present invention has a step of detecting information about a graphics object which concerns a use request for information about completed work about a proceeding work from the user, a step of searching a database of information about completed work based on a detected object and acquiring the information about the work in progress which has been done before, and a step of using the acquired information about completed work for the proceeding work.

A program of the present invention causes a computer to perform the steps of the information processing method for information registration or the information processing method for information retrieval, or the steps of an information processing method for information registration or an information processing method for information retrieval according to embodiments described later. A recording medium of the present invention records the program so that the computer can read the program.

BRIEF DESCRIPTION OF THE DRAWINGS

FIG. 6 illustrates a diagram showing a window for setting options of Japanese word processing software;

DETAILED DESCRIPTION

Figure 1:
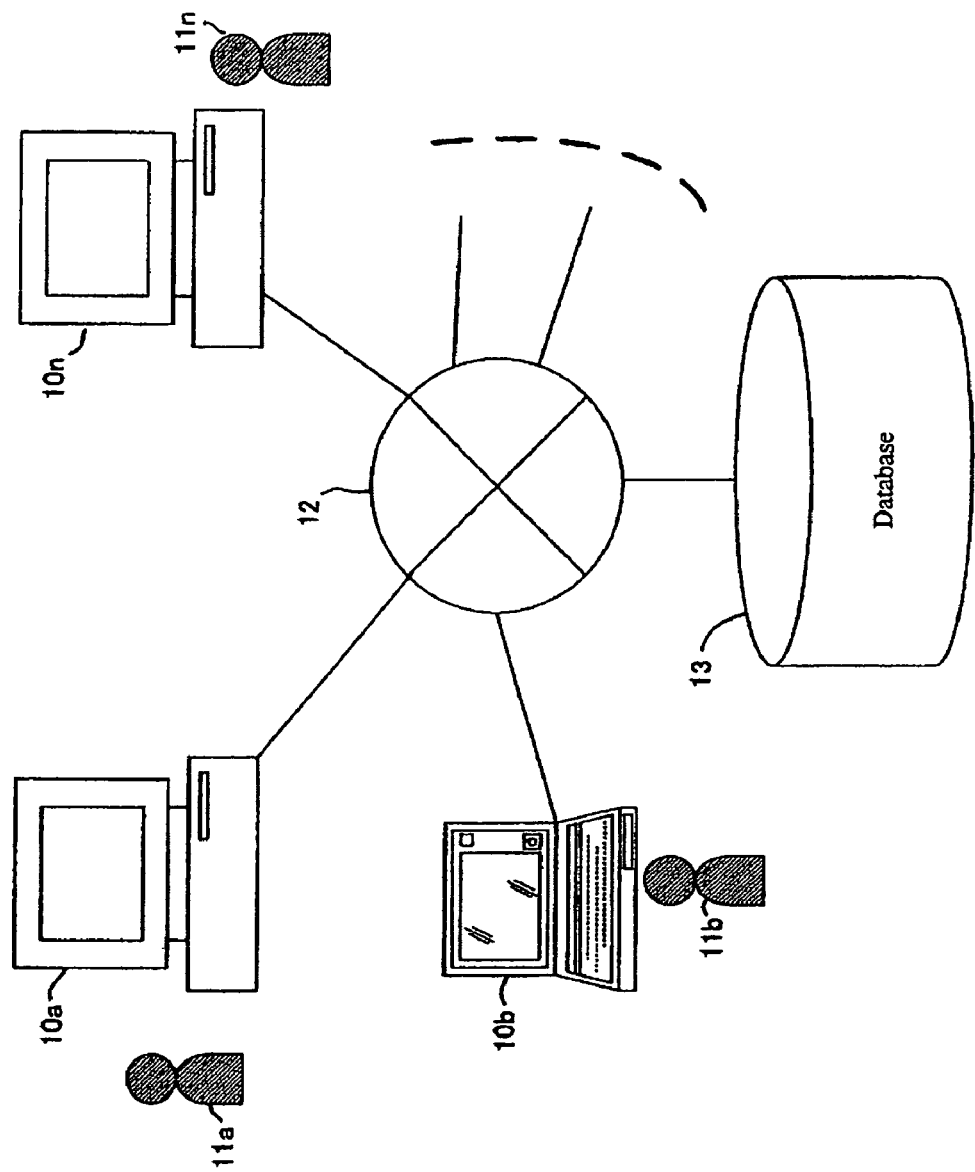
FIG. 1 illustrates a structural diagram showing a system using a database for a setting operation.

FIG. 1 is a structural diagram showing a system using a database for a setting operation. PCs (personal computers) 10a, 10b, ... 10n serving as information processors are owned by users 11a, 11b, ... 11n who belong to the same group such as a section and a department of a company. The PCs are connected to one another via a network 12 such as the Internet and a LAN and the PCs share a database 13 on the network 12. Such PCs include desktop computers and notebook computers. For example, an information processor 18 for information registration of FIG. 2 and/or an information processor 28 for information retrieval of FIG. 3 (will be described later) are composed of PCs or are packaged in the PCs.

In FIG. 1, the database 13 is separately provided outside the PCs 10a, 10b, ... 10n. The database 13 may be provided in a memory such as a hard disk of a specific PC for a predetermined user or may be distributed to the memories of two or more PCs.

Figure 2:
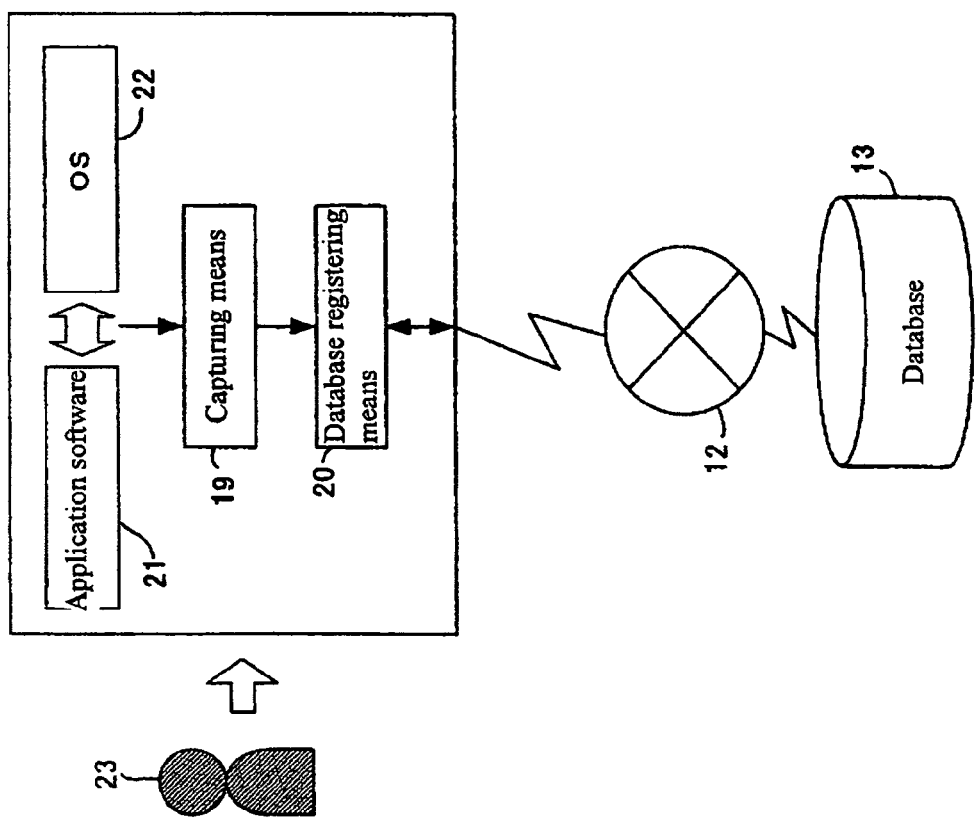
FIG. 2 illustrates a functional block diagram showing an information processor for information registration.

FIG. 2 is a functional block diagram showing the information processor 18 for information registration. The information processor 18 for information registration of a user 23 has application software 21, an OS 22, capturing means 19, and database registering means 20. The capturing means 19 captures a graphics processing command to a graphics interface from the started application software 21. The database registering means 20 registers, as information about completed work in the database 13, information about a series of graphics processing commands concerning completed works out of the captured graphics processing commands.

The graphics interface is typically packaged into the OS 22. In FIG. 2 and the subsequent FIG. 3, the information processor 18 for information registration and the information processor 28 for information retrieval comprise the application software 21 and the OS 22, and the information processor 18 for information registration and the information processor 28 for information retrieval are constituted of programs, so that the application software 21 and the OS 22 can be provided outside the information processor 18 for information registration and the information processor 28 for information retrieval.

Figure 3:
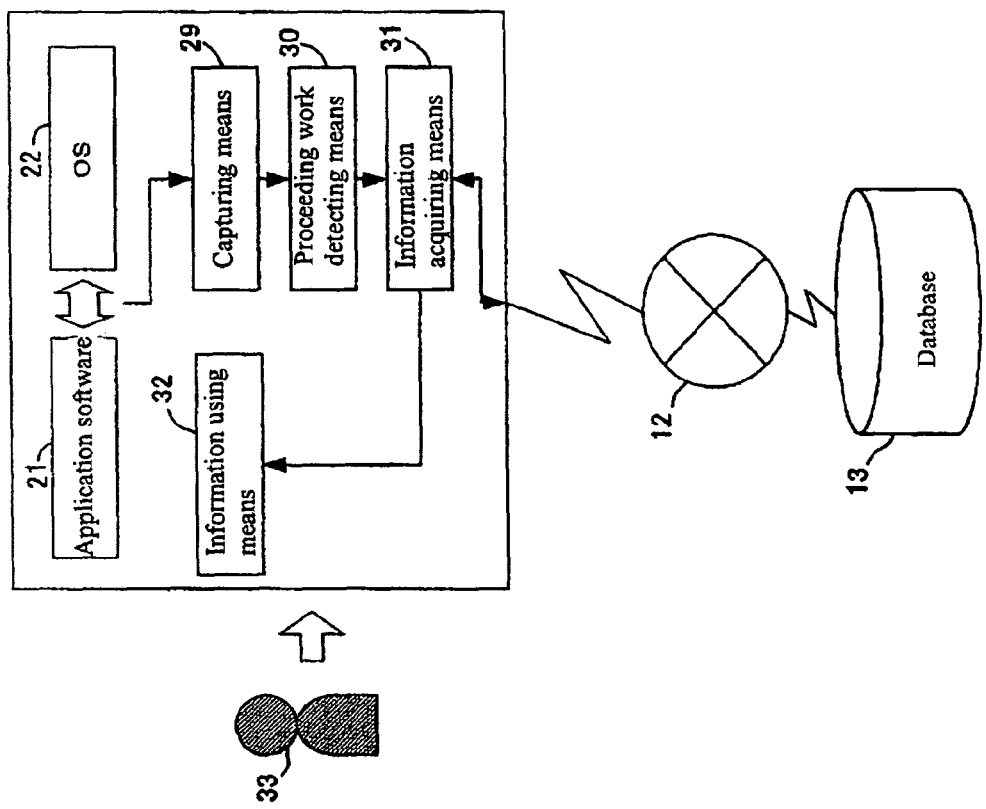
FIG. 3 illustrates a functional block diagram showing an information processor for information retrieval.

FIG. 3 is a functional block diagram showing the information processor 28 for information retrieval. The information processor 28 for information retrieval of a user 33 has capturing means 29, proceeding work detecting means 30, information acquiring means 31, and information using means 32 in addition to the application software 21 and the OS 22. The capturing means 29 captures a graphics processing command to a graphics interface from started application software. The proceeding work detecting means 30 detects a work in progress as a proceeding work based on the captured graphics processing command. The information acquiring means 31 searches a database of information about completed work for the information about the work in progress which has been done before based on the graphics processing command concerning the proceeding work and acquires the information about the work in progress which has been done before. The information using means 32 uses the information about completed work, which has been acquired by the information acquiring means, for the proceeding work.

Figure 6:
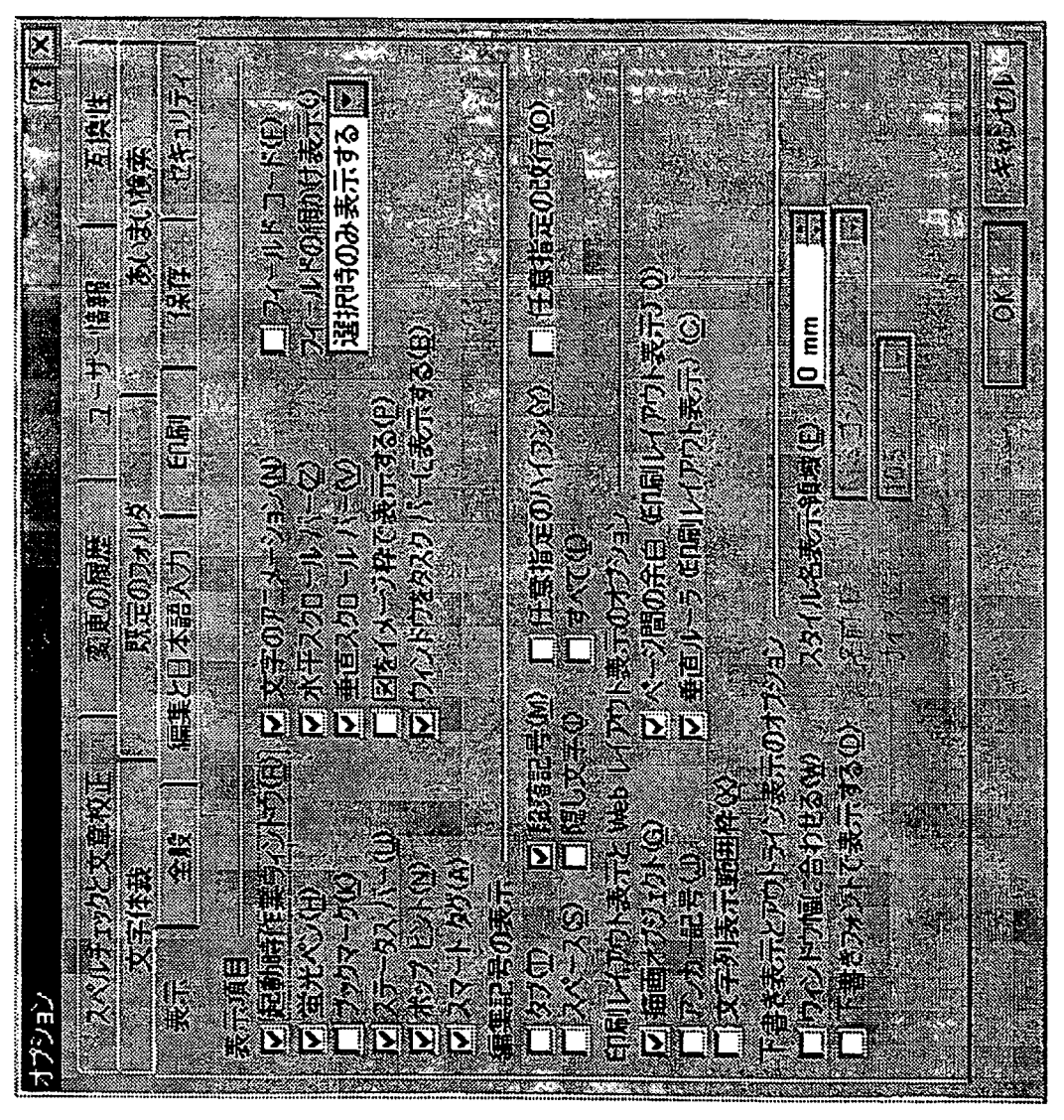
Figure 7:
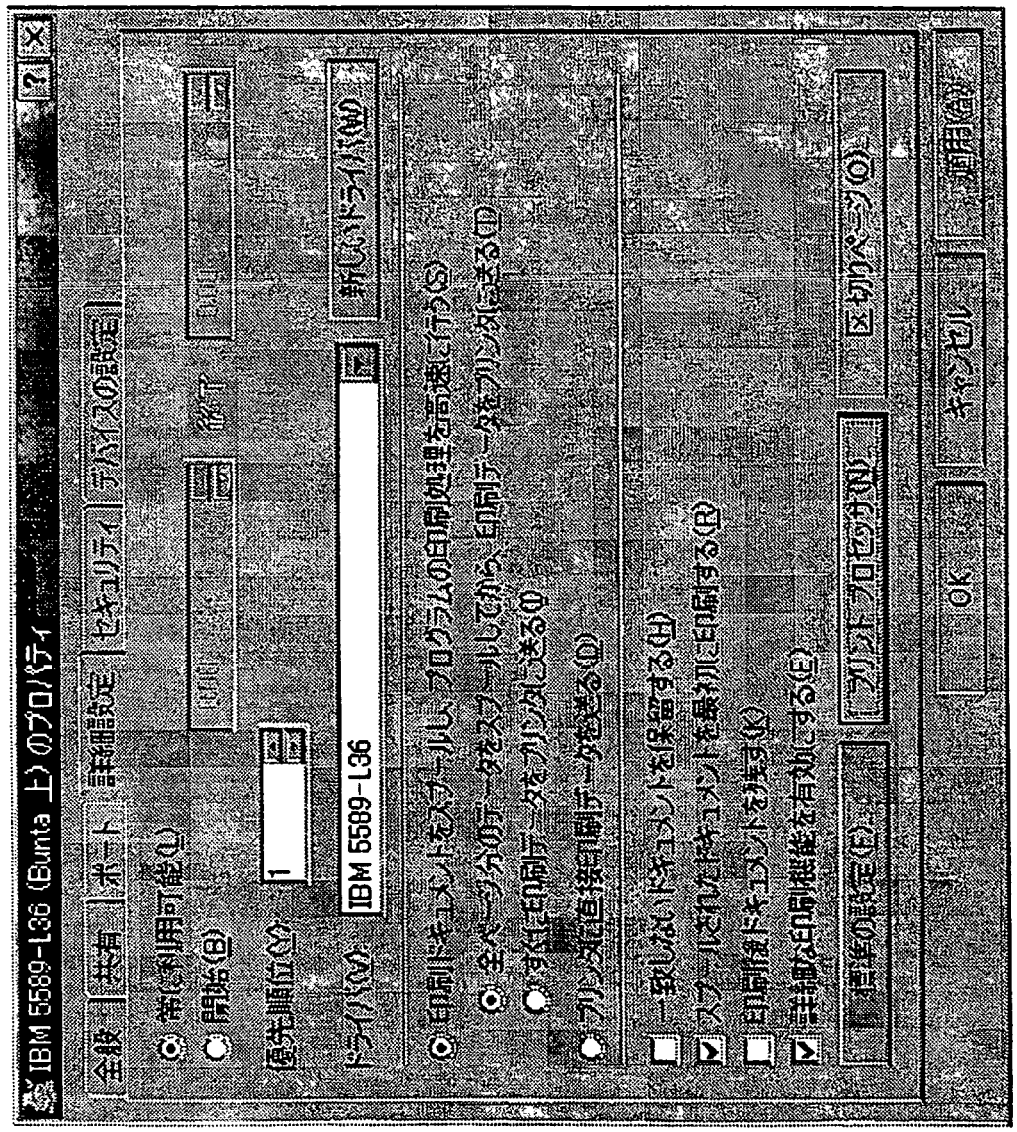
FIG. 7 illustrates a diagram showing a window for setting the property of a printer.

The work is, for example, the setting operation of application software and/or the shared resources of an assigned group. The work is not limited to the setting but includes a work for inputting predetermined sentences to a plurality of fields in a predetermined format document, a work for partially changing a general format to generate a unique format for a group, and a work for moving one or more images to a predetermined point by using the drag-and-drop function of a mouse. A setting window is designed as shown in FIGS. 6 and 7. FIG. 6 shows a window for setting options of "Microsoft Word☐," Japanese word processing software of Microsoft. In the setting window of FIG. 6, a plurality of tags is provided on the upper part. The user selects a tag to be set and displays the items of the tag, and the user selects the presence or absence of check marks by using the click button of the mouse. FIG. 7 shows a window for setting the property of "IBM 5589-L36," a printer of IBM. The entry of check marks, the selection of a radio button, and the selection of a driver are necessary in the setting.

For example, in the case of a group consisting of 20 to 100 users, some general settings (default settings) are insufficient in the application software of the PCs used by the users of the group and settings specific to the group may be made as necessary. In such settings, each user is requested to partially or entirely conform to the settings specific to the group. On the other hand, in addition to application software installed by all the users at the same time, a number of application software packages under various conditions are used in the group that include application software installed by only a few users and application software upgraded by only a few users. Further, in many cases, two or more settings of display, format, etc. are necessary for each kind of application software. Therefore, the overall group has an enormous number of works requiring common settings. A person permanently in charge of setting has to bear significant burden of making all the common settings ahead of other users and making setting data available for the users of the group, and thus it is not possible to swiftly respond to a change, an update, and so on.

Moreover, in the common setting of application software used by just a few users, a person in charge of setting may not be particularly specified.

In response, by using the information processor 18 for information registration as the PC of a user in the group or packaging the information processor 18 for information registration in the PC, regarding works completed ahead of others by someone serving as the user 23 in the group in the information processor 18 for information registration, information about a series of graphics processing commands is immediately registered in the database 13 as information about completed work. The overall group has a large number of information processors 18 for information registration and thus information about completed work about the settings in the group is swiftly registered in the database 13 increasingly.

The information about completed work, which is registered in the database 13 as information about the completion of settings of each work, is not limited to one piece. Two or more pieces of information about completed work may be registered. That is, in the case where a user U1 first completes a work X and registers the information about completed work of the work X in the database 13 and then another user U2 completes the work X in his/her own way, information about completed work I1 of the user U1 is replaced with information about completed work I2 of the user U2 (however, I1≠I2 is set, two or more different settings may be accepted in the same group). Alternatively both of I1 and I2 may be registered in the database 13. Further, the user 33 may use any one of the information about completed work I1 and I2 as information about completed work when performing the work X in the information processor 28 for information retrieval, or the user 33 may use only the new information about completed work I2. Furthermore, the names of the users who registered the information about completed work I1 and I2 (or the names of computers) may be additionally registered and displayed and the other users may select the information about completed work registered by the preferred user.

The information processor 18 for information registration and the information processor 28 for information retrieval may be the same information processors. That is, in some cases, a user U completes a setting work W1 of application software A1 by him/herself in his/her information processor and the user U uses the information about completed work I2 of the database 13, for a setting work W2 of another application software A2. Further, when a user gets stuck in the predetermined work X in his/her information processor, the information processor may act as the information processor 28 for information retrieval to retrieve the information about completed work of a preceding user. When the user does not get stuck in the work, the information processor may act as the information processor 18 for information registration to register the information about completed work of the work in the database 13.

The information about completed work is typically registered in an automatic manner from the information processor 18 for information registration to the database 13. The information may be registered in the following manner: when the user 23 completes a work, the user is caused to select whether the information about completed work of the work should be registered in the database 13, and the information about completed work is registered only when the user 23 selects registration. Moreover, typically in the information processor 28 for information retrieval, the retrieval of information about completed work is started after the user 33 clearly requests the provision of information about completed work by clicking a help icon or a help function button during a work.

Another specific examples of the information processor 18 for information registration and the information processor 28 for information retrieval will be described below.

Figure 4:
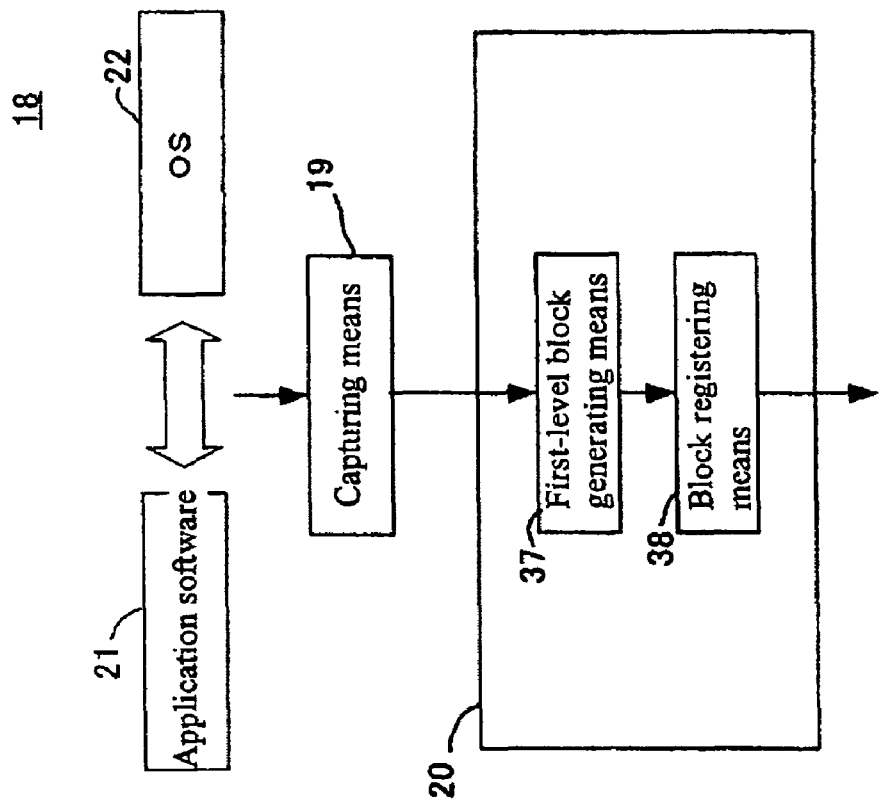
FIG. 4 illustrates a structural diagram showing a main part of the information processor for information registration that specifically indicates the inside of database registering means.

FIG. 4 is a structural diagram showing the main part of the information processor 18 for information registration. FIG. 4 specifically shows details of the database registering means 20. The database registering means 20 has first-level block generating means 37 and block registering means 38. The first-level block generating means 37 extracts graphics processing commands of the same process from all the captured graphics processing commands and generates a first-level block including the extracted graphics processing commands. The block registering means 38 matches each of the first-level blocks with a piece of information about completed work and registers each piece of the information about completed work in the database.

The OS 22 is normally capable of multitasking. Since the information processor 18 for information registration has a plurality of pieces of application software 21 in a running state, communication from the application software 21 to the OS 22 includes a processing command different from the graphics processing command and a graphics processing command for a work different from a target work for generating information about completed work. Based on this, the first-level block generating means 37 extracts graphics processing commands of the same process from all the graphics processing commands captured by the capturing means 19, so that a target graphics processing command can be efficiently extracted. Besides, each first-level block is caused to match with a piece of information about completed work and each piece of the information about completed work is registered in the database, so that the first-level block can be acquired as information about completed work in the information processor 28 for information retrieval, thereby rationalizing processing after the acquisition. Additionally, the first-level block corresponds to the blocks of Process 1 data, Process 2 data, and Process N data of FIG. 10. A typical block has a header in which the size information and time stamp of a block and other information are written when necessary.

Figure 5:
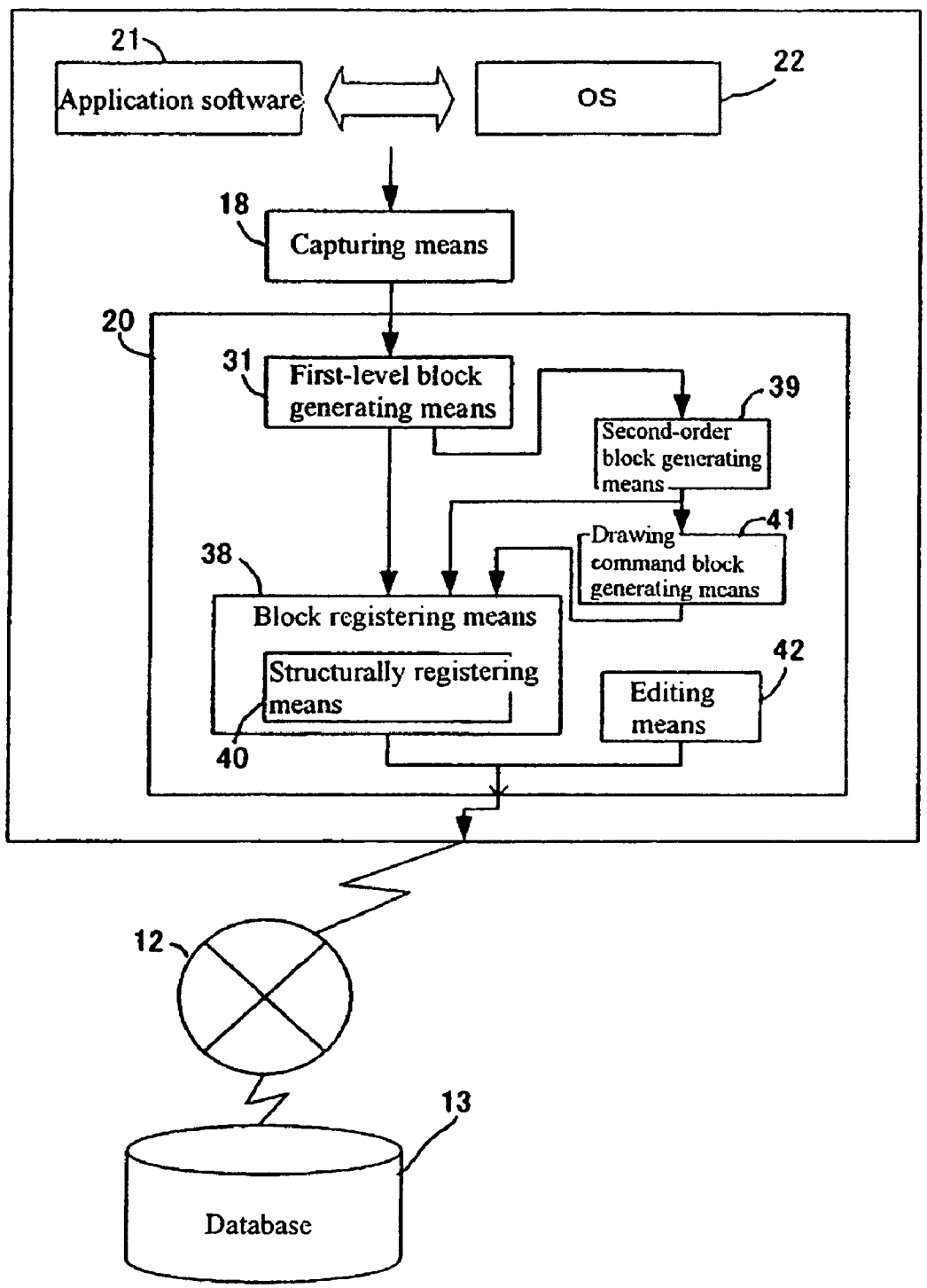
FIG. 5 illustrates a structural diagram showing the information processor for information registration that indicates the database registering means shown in FIG. 4 more specifically.

FIG. 5 is a structural diagram showing the information processor 18 for information registration, in which the database registering means 20 of FIG. 4 is shown more concretely. The database registering means 20 has second-level block generating means 39. The second-level block generating means 39 extracts graphics processing commands of the same drawing target object from one or more graphics processing commands belonging to the first-level block and generates a second-level block including the extracted graphics processing commands. The block registering means 38 includes structurally registering means 40. The structurally registering means 40 registers each piece of the information about completed work in the database 13 according to a data structure having the second-level block disposed in the first-level block as a sub-block of the first-level block.

Graphics processing commands concerning the same drawing target object are extracted from one or more graphics processing commands belonging to the first-level block, a second-level block including the extracted graphics processing commands is generated, and information about completed work in the database 13 has the second-level block disposed in the first-level block. In this way, in the information processor 28 for information retrieval, information about completed work is acquired with the first-level block and second-level block serving as structured blocks, thereby rationalizing processing after the acquisition. Additionally, the second-level block corresponds to a small block (e.g., a block having CreateProcess and CreateWindow (W1)) included in the blocks of Process 1 data, Process 2 data, and Process N data.

The database registering means 20 has drawing command block generating means 41. The drawing command block generating means 41 classifies a drawing command block, which serves as a second-level block, into third-level blocks each of which is grouped for each of a series of graphics processing commands generated for one event from the OS. The structurally registering means 40 registers each piece of information about completed work in the database 13 according to a data structure in which regarding a plurality of drawing command blocks in the same first-level block, drawing command blocks including similar third-order blocks are regarded as similar drawing command blocks, and regarding a plurality of similar drawing command blocks, the second drawing command block and later are regarded as simplified blocks whose contents are omitted by indicating that the contents are similar to those of the first drawing command block.

The second drawing command block and later are substituted by simple command blocks, so that the structure of information about completed work is simplified and the data size can be reduced. Further, the first and the second drawing commands and later respectively correspond to DrawCmd and RepeatDrawCmd in the right block of FIG. 11.

The structurization of information about completed work in the database 13 also contributes to rationalized retrieval in the information processor 18 for information registration. For example, it can be considered that one or more elements of information about completed work are connected in series to form a string, a hash value corresponding to the string is calculated, and an address corresponding to the hash value is used as the storage location of the first-level block. In this case, by using names corresponding to the first-order and second-level blocks (e.g. a window name, an object name, and so on) as elements of information about completed work, it is possible to efficiently find out corresponding information about completed work.

The information about completed work is composed of a symbol string in which each processing command is expressed by a programming language. Editing means 42 enables the user to edit the symbol string of the information about completed work. Besides, the editing means 42 may be provided in the information processor 28 for information retrieval.

By editing information about completed work, it is possible to change the color of a specific button and highlight a character string. Further, it is possible to delete unnecessary commands. For example, when a past operation example is displayed, instead of simply displaying completely the same image as a recorded image, a highlighted display is provided by changing a color to red on a character string of a button to be operated by the user, and the frame of the button is displayed in bold type, thereby achieving a displaying method readily used as a guide.

In a screen capture of an ordinary bit map format, such editing is quite difficult. Such editing may be manually performed or mechanically performed in an automatic manner.

In FIG. 3 again, in the information processor 28 for information retrieval, the information using means 32 has static image display means (not shown) for displaying the setting data of information about completed work as a static image, automatic executing means (not shown) for automatically executing a proceeding work based on the setting data of information about completed work, or moving image generating means (not shown) for displaying as a moving image the flow of user setting of a setting operation.

In this way, information about completed work having been registered in the database 13 for each setting operation is provided for the user as a static image display, an automatic execution, or a moving image in the information processor 28 for information retrieval. In a static image display, supporting information about completed work (e.g. FIGS. 6 and 7), which indicates settings performed on items by the user ahead of others, is displayed on the display of the information processor 28 for information retrieval with a different size and position from the original information about completed work. In the automatic execution, the CPU of the information processor 28 for information retrieval extracts each piece of setting data from information about completed work and sets each item of target settings of the information processor 28 for information retrieval according to the setting data. A moving image display is useful when the setting operation includes a moving operation such as drag-and-drop.

Moreover, in the information processor 28 for information retrieval, the information acquiring means 31 detects a user operation of a proceeding work from graphics processing commands captured by the capturing means 29 and retrieves the information about completed work about the proceeding work based on the detected user operation.

The user operation detected from graphics processing commands captured by the capturing means 29 includes not only a single user operation but also a plurality of user operations and a user operation history, which is a plurality of user operations performed in consideration of the order.

The database 13 has information about completed work as a first-level block (outside block in FIG. 10) including graphics processing commands of the same process. In contrast, the information acquiring means 31 acquires information about completed work about a proceeding work as a single first-level block from the database.

Additionally, the information about completed work in the database 13 is configured so that graphics processing commands concerning the same drawing target object are extracted from one or more graphics processing commands belonging to a first-level block, a second-level block including the extracted graphics processing commands is generated (inside block of each Process in FIG. 10), and the second-level block is disposed in the first-level block as a sub-block of the first-level block. In contrast, the information acquiring means 31 acquires, from the database, information about completed work about a proceeding work as a single first-level block including a plurality of second-level blocks.

The information about completed work in the database 13 has a data structure in which the inside of a drawing command block serving as a second-level block is classified into three-order blocks, each of which is grouped for each of a series of graphics processing commands generated for one event from the OS, regarding a plurality of drawing command blocks (DrawCmd in the left block of FIG. 11) in the same first-level block, drawing command blocks including similar third-order blocks are regarded as similar drawing command blocks, and regarding a plurality of similar drawing command blocks, the second drawing command block and later are regarded as simplified blocks (RepeatDrawCmd in the right block of FIG. 11) whose contents are omitted by indicating that the contents are similar to those of the first drawing command block. The information acquiring means 31 acquires, from the database 13, information about completed work about a proceeding work as a single first-level block including the simplified block.

Besides, the information processor 28 for information retrieval may have graphics object information detecting means instead of the capturing means 29. In this case, the graphics object information detecting means detects information about a graphics object which concerns a use request for information about completed work about a proceeding work from the user, the information acquiring means 31 searches the database 13 concerning the information about completed work and acquires the information about completed work based on a detected object, and the information using means 32 uses the information about completed work, which has been acquired by the acquiring/searching means 31, for a proceeding work.

Figure 8:
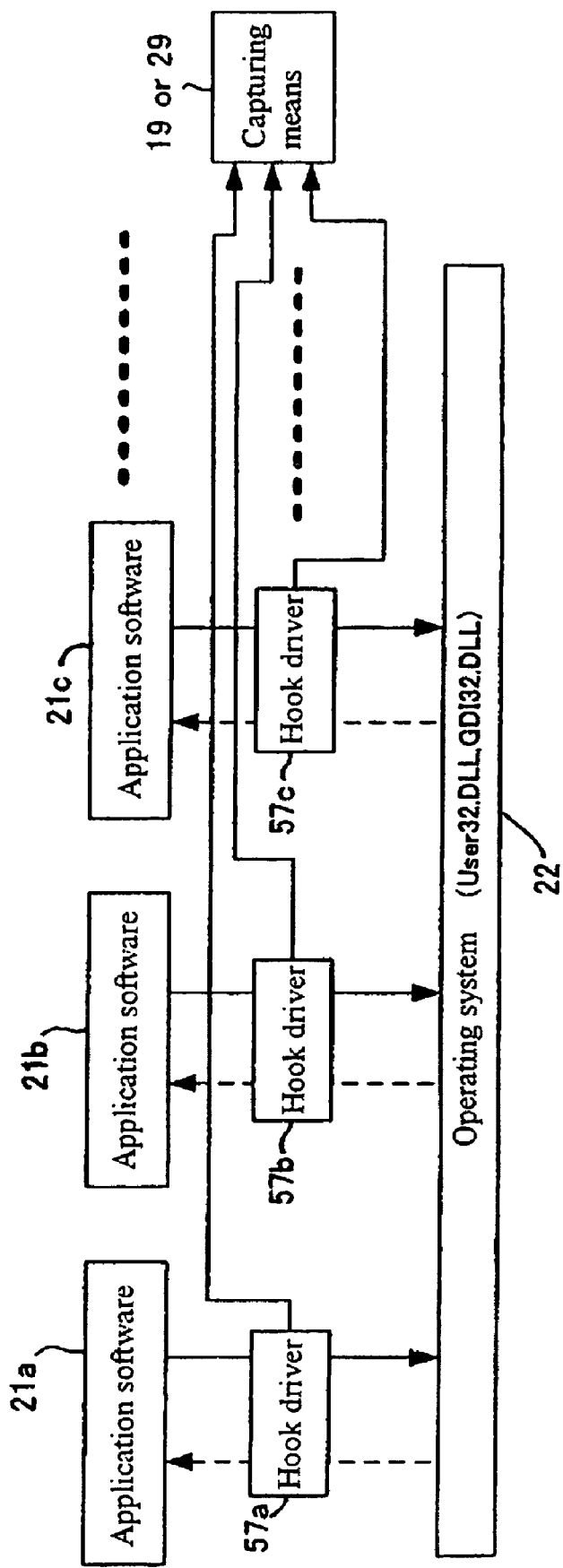
FIG. 8 illustrates an explanatory drawing showing a principle for capturing means which captures user operations in each setting operation.

FIG. 8 is an explanatory drawing showing a principle when the capturing means 19 and 29 capture a user operation in each setting operation. Hook drivers 57a, 57b, 57c, . . . are provided between the application software 21a, 21b, 21c, . . . and the OS 22. The hook drivers 57a, 57b, 57c, . . . can monitor an API call made by the application software 21a, 21b, 21c, . . . and the transmission of a message from the system to the application software. The capturing means 19 which has captured the API call and the transmission of a message sends the kind of event, a parameter, and so on to the database registering means 20 and generates data. FIG. 8 will be specifically described in embodiments, which will be discussed later.

The following list of symbol string A is obtained by shaping all graphics processing command strings, which have been issued on the system when the setting operation of a DNS (Domain Name System) server is captured, into a text format in the information processor 18 for information registration. To avoid complexity, data not associated with retrieval is omitted that includes drawing data and mouse data. Measurements were performed in Microsoft Windows□ XP. Numbers on the left of the symbol string lines are inserted for the convenience of explanation. Actual capturing does not have such line numbers. Further, CaptureStart at the front (line number 10) of the symbol string A indicates an event where the hook driver has started a hook but does not indicate an API called by the application program or a message sent by the OS. The definition of each parameter in the symbol will be described after the list of the symbol string A.

(Symbol string A)
10:(CaptureStart)
11:UpdateVideoMode 1280×1024 16 bpp 60 Hz
12:CreateProcess 13:17:01 [1008] "C:¥Program Files¥Debugging Tools for Windows¥windbg.exe"
13:CreateWindow 0x10014 Parent 0 [1008.632] (1) Class "#32769"
14:MoveWindow 0x10014 (0, 0) 1280×1024 Z 0
15:CreateProcess 13:17:02 [420] "C:¥WINDOWS¥Explorer.EXE"
16:CreateWindow 0x10014 Parent 0 [420.632] (1) Class "#32769"
17:CreateProcess 13:17:02 [944] "V:¥code¥PCService¥Sable¥SABLEManager¥debug¥SABLEController.exe"
. . .
100:MoveWindow 0x502b0 (0, 0) 0×0 Z 0x30314
101:MoveWindow 0x502ac (0, 0) 0×0 Z 0x502b0
102:MoveWindow 0x602c0 (110, 110) 367×443 Z 0x502ac
103:ActivateWindow 0x602c0 [Active]
104:ActivateWindow 0x402be [Active]
105:CreateWindow 0x50316 Parent 0 [420.640] (332) Class "#32770"
106:MoveWindow 0x50316 (153, 194) 336×253 Z 0x502ac 107:CreateWindow 0x40324 Parent 0x50316 [420.640] (333) Class "Button"
108:MoveWindow 0x40324 (6, 198) 75×23 Z 0
109:CreateWindow 0x40326 Parent 0x50316 [420.640] (334) Class "Button"
110:MoveWindow 0x40326 (87, 198) 75×23 Z 0x40324
111:CreateWindow 0x40328 Parent 0x50316 [420.640] (335) Class "Button"
. . .

For example, when only a graphics processing command concerning a window having the class name "#32770" of process "C:¥WINDOWS¥Explorer.exe" is extracted from the symbol string A, line number 15 and line numbers 105 to 111 are obtained. That is, an extraction is not performed on graphics processing commands concerning processes other than "C:¥WINDOWS¥Explorer.exe" and graphics processing commands concerning windows other than the window having the class name "#32770" even if the graphics processing commands concern the process "C:¥WINDOWS¥Explorer.exe".
(Definition of Parameters in a Symbol)
  CreateProcess 13:17:02 [420] "C:¥WINDOWS¥Explorer.EXE" of line number 15 is a symbol of process generation and parameters are defined as follows:
13:17:02: starting time
420: process ID
"C:¥WINDOWS¥Explorer.EXE": file name of a program
  CreateWindow 0x50316 Parent 0 [420.640] (332) Class "#32770" of line number 105 is a symbol of window generation and parameters are defined as follows:
0x50316: identifier called window handle
Parent 0: in the case of 0, the window does not have any parent windows, that is a top-level window. If the parameter has a number other than 0, a parent window handle is designated.
[420.640]: process ID 420, thread ID 640
332: the number of windows at that time
Class "#32770": class name is "#32770"
  MoveWindow 0x50316 (153, 194) 336×253 Z 0x502ac of line 106 is a symbol of window movement and parameters are defined as follows:
0x50136: window handle
(153, 194): coordinates on the upper left corner after movement
336×253: size after movement
Z 0x502ac: high-order window handle in the Z-order (comes under a window 0x502ac)

The following list of symbol string B is obtained by shaping all graphics processing command strings, which have been issued on the system when the setting operation of the DNS server is captured, into a text format in the information processor 28 for information retrieval. As in the case of the information processor 18 for information registration, data such as drawing data and mouse data that is not associated with searching was omitted to avoid complexity and measurements were performed in Microsoft Windows□ XP.
(Symbol string B)
200:MoveWindow 0x6017e (0, 0) 472×194 Z 0
201:CreateWindow 0x3022c Parent 0 [1288.1960] (5) Class "MSCTFIME UI"
202:MoveWindow 0x3022C (0, 0) 0×0 Z 0x800a4
203:CreateWindow 0x6016e Parent 0 [1288.1960] (6) Class "IME"
204:MoveWindow 0x6016e (0, 0) 0×0 Z 0x3022c
205:CreateProcess 13:11:31 [556] "C:¥WINDOWS¥Explorer.EXE"
206:CreateWindow 0x10014 Parent 0 [556.632] (7) Class "#32769"
207:CreateProcess 13:11:32 [1716] "C:¥Program Files¥Messenger¥msmsgs.exe"
. . .
300:MoveWindow 0x6016a (0, 0) 0×0 Z 0x800a4
301:MoveWindow 0x9015c (0, 0) 0×0 Z 0x6016a
302:MoveWindow 0xe020e (0, 0) 0×0 Z 0x9015c
303:MoveWindow 0x1201ac (132, 132) 367×443 Z 0xe020e
304:ActivateWindow 0x1201ac [Active]
305:ActivateWindow 0x3021c [Active]
306:CreateWindow 0x7017a Parent 0 [556.1284] (157) Class "#32770"
307:MoveWindow 0x7017a (175, 216) 336×253 Z 0x6016a
308:CreateWindow 0xc01bc Parent 0x7017a [556.1284] (158) Class "Button"
309:MoveWindow 0xc01bc (6, 198) 75×23 Z 0
310:CreateWindow 0x1201b6 Parent 0x7017a [556.1284] (159) Class "Button".
311:MoveWindow 0x1201b6 (87, 198) 75×23 Z 0xc01bc
312:CreateWindow 0xe019a Parent 0x7017a [556.1284] (160) Class "Button"
313:MoveWindow 0xe019a (168, 198) 75×23 Z 0x1201b6
314:CreateWindow 0x70156 Parent 0x7017a [556.1284] (161) Class "Button"
. . .

For example, when only a graphics processing command concerning a window having the class name "#32770" of process "C:¥WINDOWS¥Explorer.exe" is extracted from the symbol string B, line numbers 306 to 314 are obtained.

Figure 9:
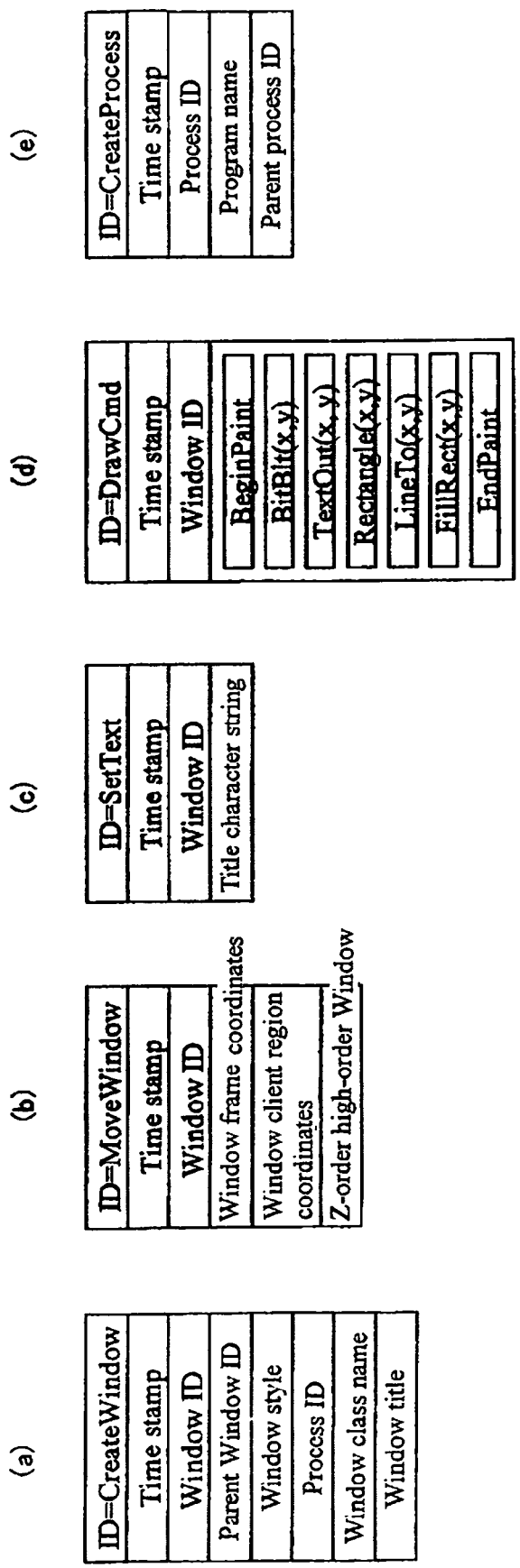
FIG. 9 illustrates a diagram showing data formats of a series of graphics processing commands for various events.

The database registering means 20 shapes user operation information, which has been captured by the capturing means 19, into a designated data format and registers the data format in the database 13. FIG. 9 shows an example of data formats concerning a series of graphics processing commands for various events. (a) is the data format of a window creation event (CreateWindow), (b) is the data format of a window size/position change event (MoveWindow), (c) is the data format of a window title change event (SetText), and (d) is the data format of a screen drawing command (DrawCmd), and (e) is the data format of an application start event (CreateProcess). Other than the illustrated events, events including a window deletion event, an off-screen buffer ensure/release event, a mouse operation event, and a menu operation event are available.

Figure 10:
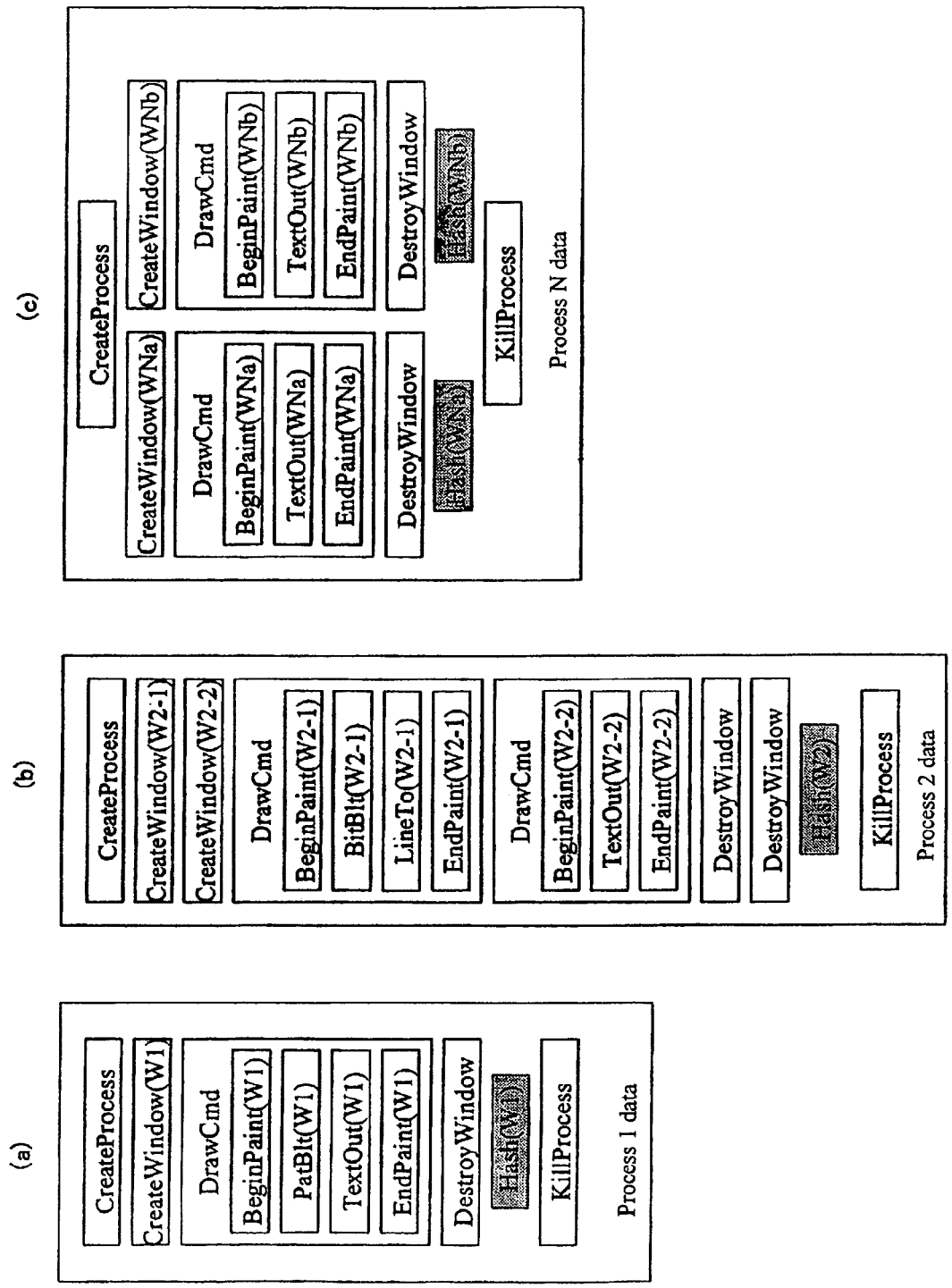
FIG. 10 illustrates a diagram showing the structure of information about completed work which is registered in a database 13 for each setting operation by database registering means.

In the registration of data in the database 13, the database registering means 20 classifies the data for each process and each graphics object (window and off-screen buffer) and captures the data, instead of simply adding generated data in temporal order. Further, in order to readily search the contents of operations based on the creation pattern of a graphics object, the hash value and so on of a data string are registered as search keys accompanying the data. FIG. 10 shows the structure of information about completed work registered by the database registering means for each setting operation in the database 13. FIG. 10 will be specifically discussed in Illustrative Embodiment 1 later.

It is assumed that symbol string C below is a command string obtained by extracting only the graphics processing commands of target windows W1, W2-1, and W2-2 from all the processing commands captured by the capturing means 19. Line numbers on the left end are inserted simply for the convenience of explanation.
(Symbol string C)
400:CreateProcess(P1);
401:CreateWindow(W1);
402:BeginPaint(W1);

403:CreateProcess(P2);
404:CreateWindow(W2-1);
405:CreateWindow(W2-2);
406:PatBlt(W1);
407:TextOut(W1);
408:BeginPaint(W2-1);
409:BitBlt(W2-1);
410:LineTo(W2-1);
411:EndPaint(W2-1);
412:EndPaint(W1);
413:DestroyWindow(W1);
414:BeginPaint(W2-2);
415:TextOut(W2-2);
416:KillProcess(P1);
417:EndPaint(W2-2);
418:DestroyWindow(W2-1);
419:DestroyWindow(W2-2);
420:KillProcess(P2);

The time-series data is classified into processes 1 and 2 for each of the processes P1 and P2 and the windows W1, W2-1, and W2-2 in the left two blocks of FIG. 10. Meanwhile, in a multitask environment, a task switch is caused at a proper interval by the scheduler of the OS and thus the order of processing command strings in the overall system cannot be expected. However, when a classification is made for each of the windows and only data on a specific window is examined, it is found that processing commands are created in the same order every time the same picture is displayed. Considering this point, it is decided that similar processing command patterns have similar operation contents in the present invention.

Figure 11:
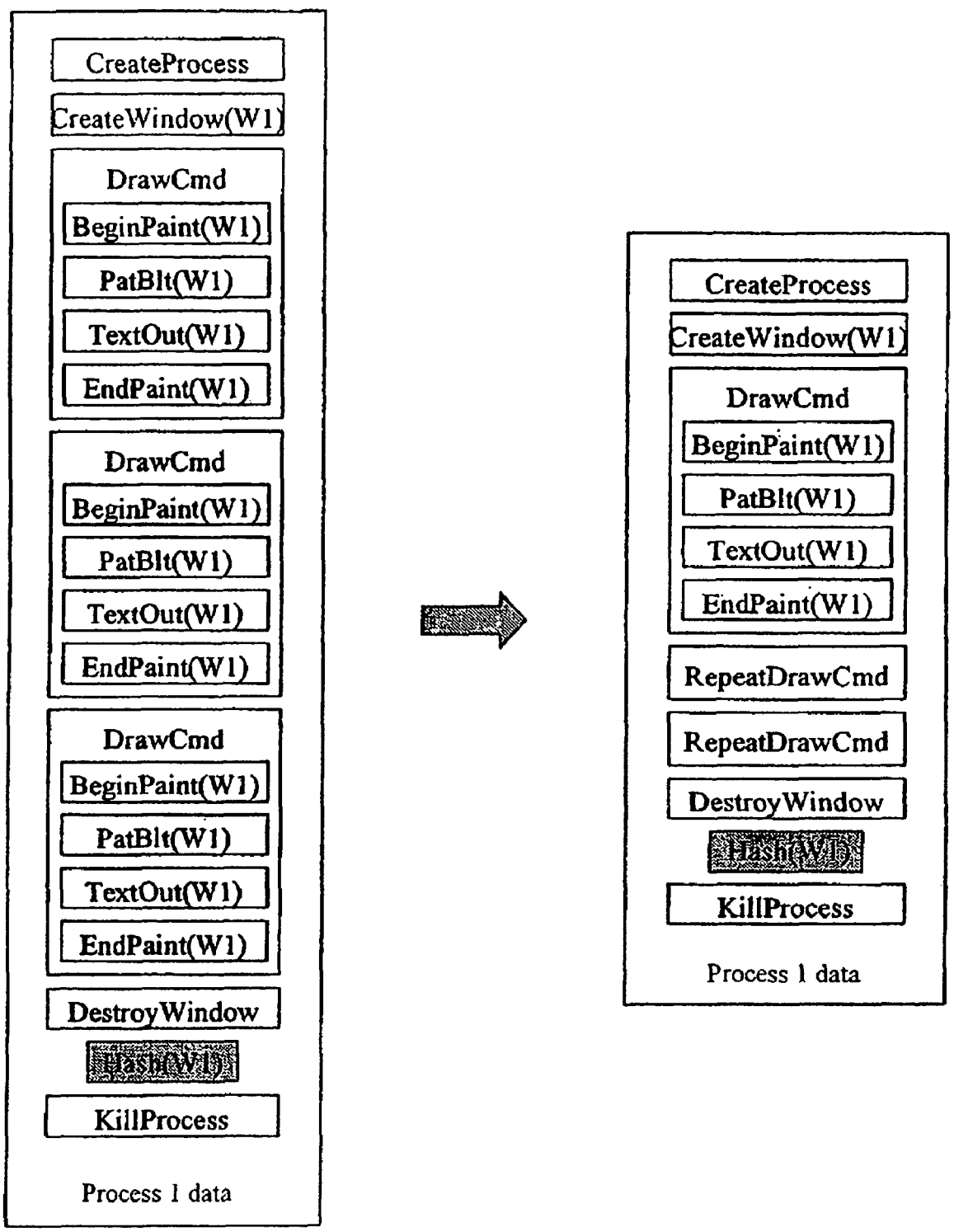
FIG. 11 illustrates an explanatory drawing showing that only a series of drawing commands generated for one event from an OS are extracted and the series of drawing commands are used as a drawing command block.

In general, even after a window is created, a picture in the window is redrawn in response to various events. For example, another overlaid window disappears and thus a picture needs to be redrawn in a new region. At this point, by making a distinction between a drawing command executed at the first creation and a drawing command executed at the redrawing, retrieval, editing, compression and so on can be performed with ease. For example, if a redrawing command is completely the same as the previous drawing command, the second drawing command and later can be simply replaced with a command "same as the previous command." In order to achieve such a function, it is not preferable to simply pack drawing commands in the order of creation but it is necessary to divide drawing commands for each event. FIG. 11 is a structural diagram showing information about completed work about a process having a redrawing command replaced with the first drawing command. DrawCmd for the second time and later in the left data structure is replaced with RepeatDrawCmd with a smaller size in the right data structure.

Figure 12:
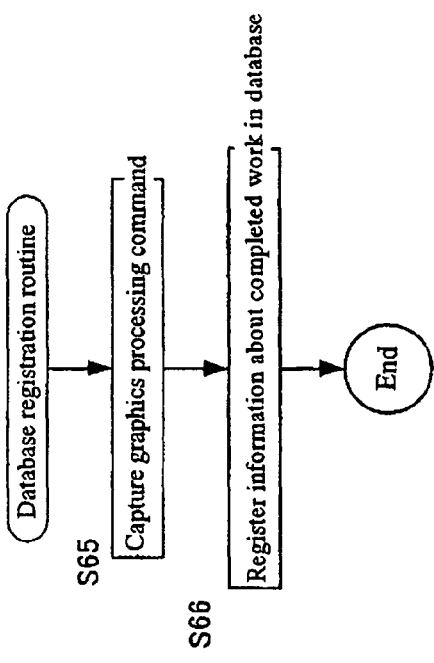
FIG. 12 illustrates a flowchart showing a data base registration routine.

FIG. 12 is a flowchart showing a database registration routine. The database registration routine is packaged in the information processor 18 for information registration. In S65, graphics processing commands from started application software to a graphics interface are captured. In S66, from captured graphics processing commands, information about a series of graphics processing commands for completed works is registered in the database 13 as information about completed work.

A specific example of the database registration routine will be described below in accordance with FIGS. 13 and 14. The work is a setting operation for application software and/or the shared resource of an assigned group.

Figure 13:
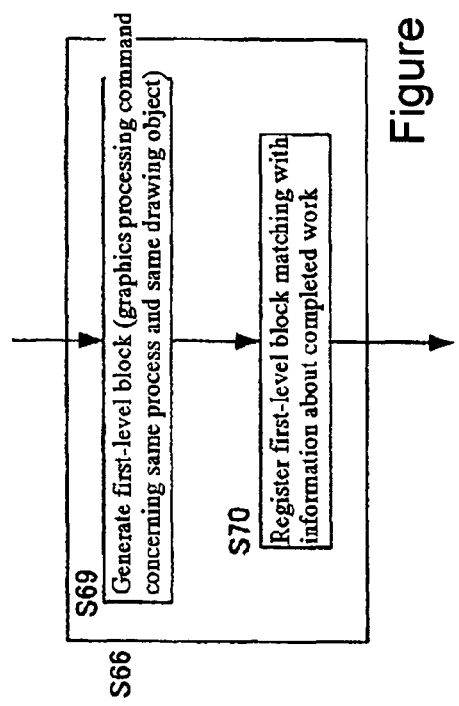
FIG. 13 illustrates a flowchart specifically showing the steps of the database registration routine shown in FIG. 12.

In FIG. 13, S66 has sub-steps S69 and S70. In S69, graphics processing commands for the same process are extracted from all the captured graphics processing commands to create a first-level block including the extracted graphics processing commands. In S70, the first-level block is matched with a piece of information about completed work and the piece of the information about completed work is registered in the database.

Figure 14:
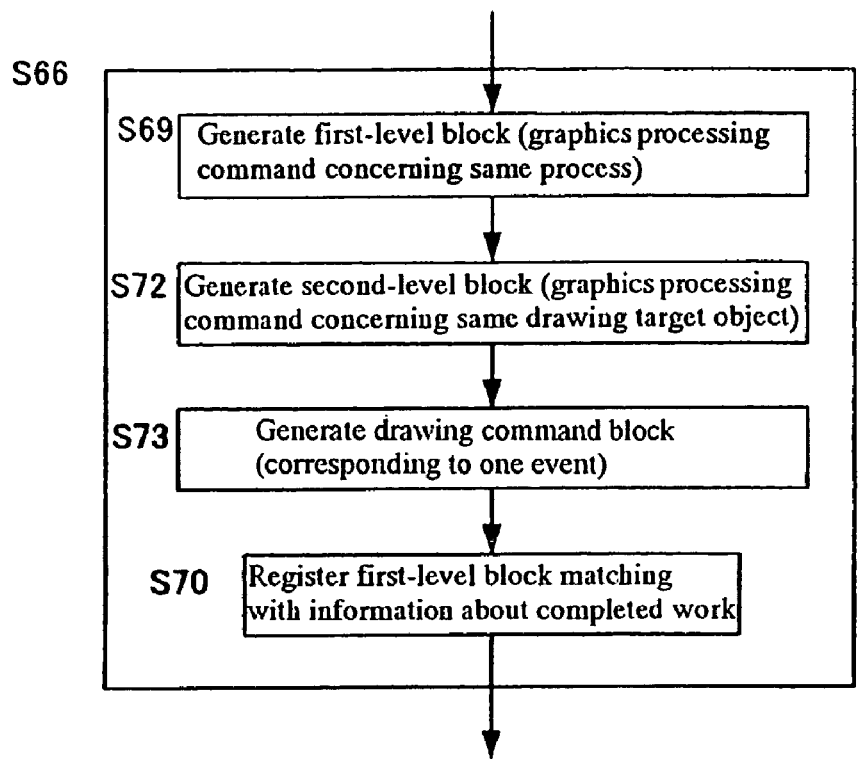
FIG. 14 illustrates a flowchart specifically showing the steps of the database registration routine shown in FIG. 12.

In FIG. 14, S66 includes a sub-step S72. In S72, graphics processing commands concerning the same drawing target object are extracted from one or more graphics processing commands belonging to the first-level block and a second-level block including the extracted graphics processing commands is generated. In S70, each piece of information about completed work is registered in the database according to a data structure in which the second-level block is disposed in the first-level block as a sub-block of the first-level block.

Moreover, in S66, the following processing may be performed for the right and left blocks of FIG. 11. In the sub step S73 of S66, the inside of a drawing command block serving as a second-level block is classified into three-order blocks (DrawCmd in the left block of FIG. 11), each of which is grouped for each of a series of graphics processing commands generated for one event from the OS. Then in S73, each piece of information about completed work is registered in the database 13 according to a data structure in which regarding a plurality of drawing command blocks in the same first-level block, drawing command blocks including similar third-order blocks are regarded as similar drawing command blocks, and regarding a plurality of similar drawing command blocks, the second drawing command block and later are regarded as simplified blocks (RepeatDrawCmd in the right block of FIG. 11) whose contents are omitted by indicating that the contents are similar to those of the first drawing command block.

Figure 15:
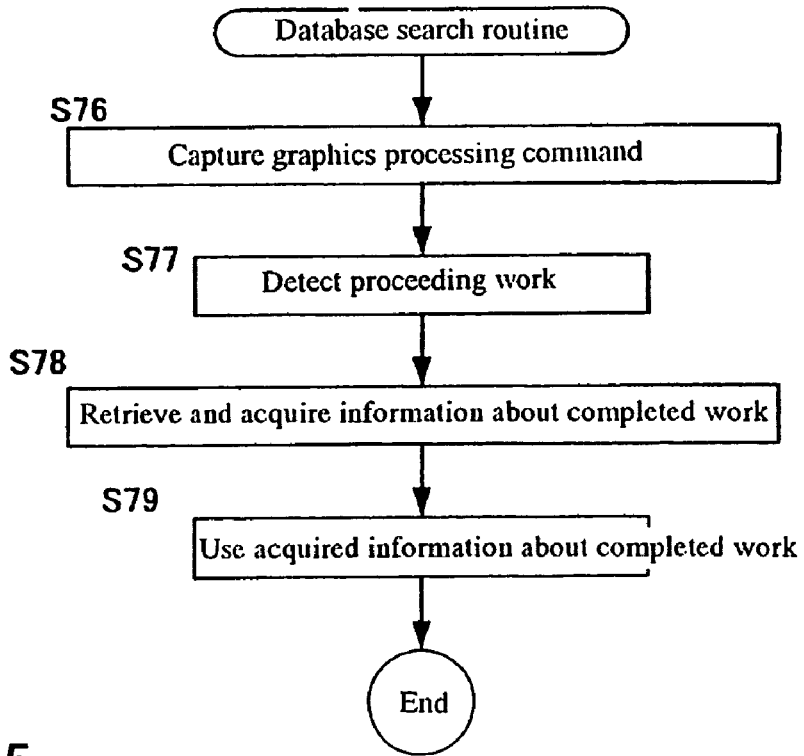
FIG. 15 illustrates a flowchart showing a database search routine.

FIG. 15 is a flowchart showing a database search routine. In S76, a graphics processing command to a graphics interface is captured from started application software. In S77, a work in progress is detected as a proceeding work based on the captured graphics processing command. In S78, a search is performed on the database 13 for information about completed work about the proceeding work based on the graphics processing command concerning the proceeding work, and information about completed work for the proceeding work is acquired. In S79, the acquired information about completed work is used for the proceeding work.

A specific example of the database search routine will be described below. The work is a setting operation for application software and/or the shared resource of an assigned group.

S79 has a sub-step of displaying the setting data of information about completed work as a static image, a sub-step of automatically executing a proceeding work based on the setting data of information about completed work, and/or a step of displaying as a moving image the flow of user setting of a setting operation. The selection of the sub-steps may be switched according to the kind of work.

In S78, a user operation of a proceeding work is detected from graphics processing commands captured in S76, and the information about the work in progress which has been done before is retrieved based on detected user operation.

The user operation detected from captured graphics processing commands includes not only a single user operation but also a plurality of user operations and a user operation history, which concerns a plurality of user operations performed in consideration of the order.

The database 13 has information about completed work as a first-level block including graphics processing commands of the same process. In contrast, in S78, information about completed work about a proceeding work is acquired as a single first-level block from the database.

Information about completed work in the database 13 is configured so that graphics processing commands concerning the same drawing target object are extracted from one or more graphics processing commands belonging to a first-level block, a second-level block including the extracted graphics processing commands is generated, and the second-level block is disposed in the first-level block as a sub-block of the first-level block. In contrast, in S78, information about completed work about a proceeding work is acquired from the database as a single first-level block including a plurality of second-level blocks.

Information about completed work in the database has a data structure in which the inside of a drawing command block serving as a second-level block is classified into three-order blocks, each of which is grouped for each of a series of graphics processing commands generated for one event from the OS, regarding a plurality of drawing command blocks in the same first-level block, drawing command blocks including similar third-order blocks are regarded as similar drawing command blocks, and regarding a plurality of similar drawing command blocks, the second drawing command block and later are regarded as simplified blocks whose contents are omitted by indicating that the contents are similar to those of the first drawing command block. In contrast, in S78, information about completed work about a proceeding work is acquired from the database as a single first-type block including a simplified block.

The database search routine may be constituted of the following steps: a step of detecting information about a graphics object which concerns a use request for information about completed work about a proceeding work from the user, a step of searching the database 13 of the information about completed work and acquiring the information about the work in progress which has been done before based on a detected object, and a step of using the information about completed work, which has been acquired by the searching means, for the proceeding work. The search is performed based on an object concerning the use request for information about completed work from the user instead of the operation history of the user, thereby omitting the records of the operation history of the user.

The present invention can be realized as hardware, software, or a combination of hardware and software. In the execution using a combination of hardware and software, a typical example is execution in a computer system having a predetermined program. In this case, the predetermined program is loaded and executed in the computer system, so that the program controls the computer system to perform the processing of the present invention. This program is constituted of command groups expressible by given languages, codes, and notations. Such command groups enable the system to perform a specific function directly or after one or both of 1. conversion into another language, code, and notation and 2. duplication into another medium. As a matter of course, the present invention includes the medium having captured the program as well as the program. The program for implementing the present invention can be stored in a given capturing medium which is readable by a computer and includes a floppy disk, an MO, a CD-ROM, a DVD, a hard disk, a ROM, an MRAM, and a RAM. For the storage in the capturing medium, such a program is downloaded from another computer system connected via a communication line or the program is duplicated from another capturing medium. Further, such a program can be compressed or divided into two or more and can be stored in one or more capturing mediums.

Figure 16:
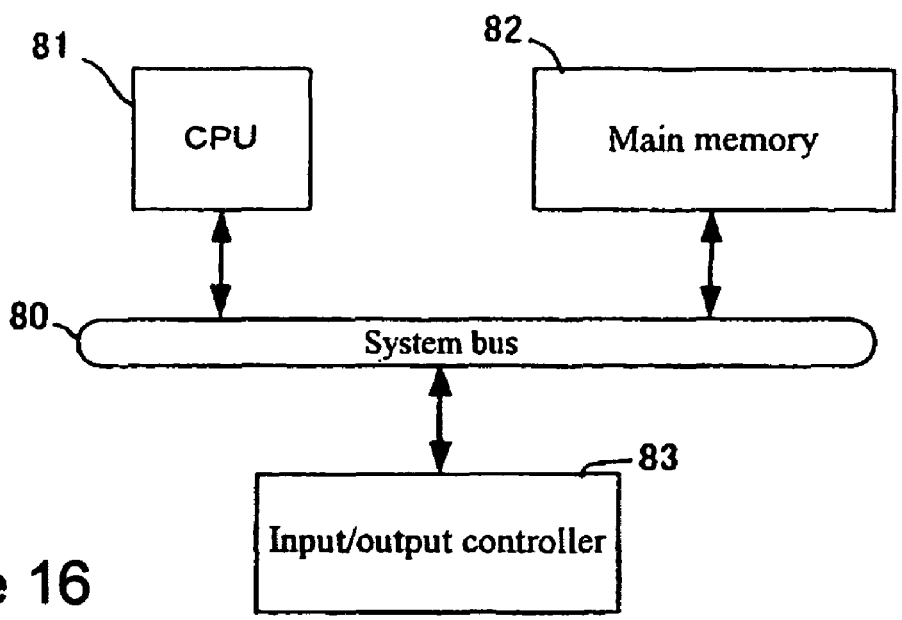
FIG. 16 illustrates a hardware structural diagram for executing a program.

FIG. 16 is a hardware structural diagram for executing a program. For example, the program for causing a computer to act as the means of the information processor 18 for information registration and the information processor 28 for information retrieval is executed by using the hardware of FIG. 16. Alternatively, for example, the hardware of FIG. 16 is used to execute an information about completed work generating program and an information about completed work using program for causing the computer to perform the steps (including the sub-steps) of the information about completed work generating method and the information about completed work using method. A CPU 81, a main memory 82, and an input/output controller 83 are connected to a system bus 80. The above means or steps can be performed as coded programs. The input/output controller 83 includes a hard disk interface, and programs executed by the CPU 81 are stored in a hard disk and so on. The program is stored in the main memory 82 prior to the execution in the CPU 81. The CPU 81 sequentially reads the command lines of the main memory 82 to execute the program.

Illustrative Embodiment 1

Figure 17:
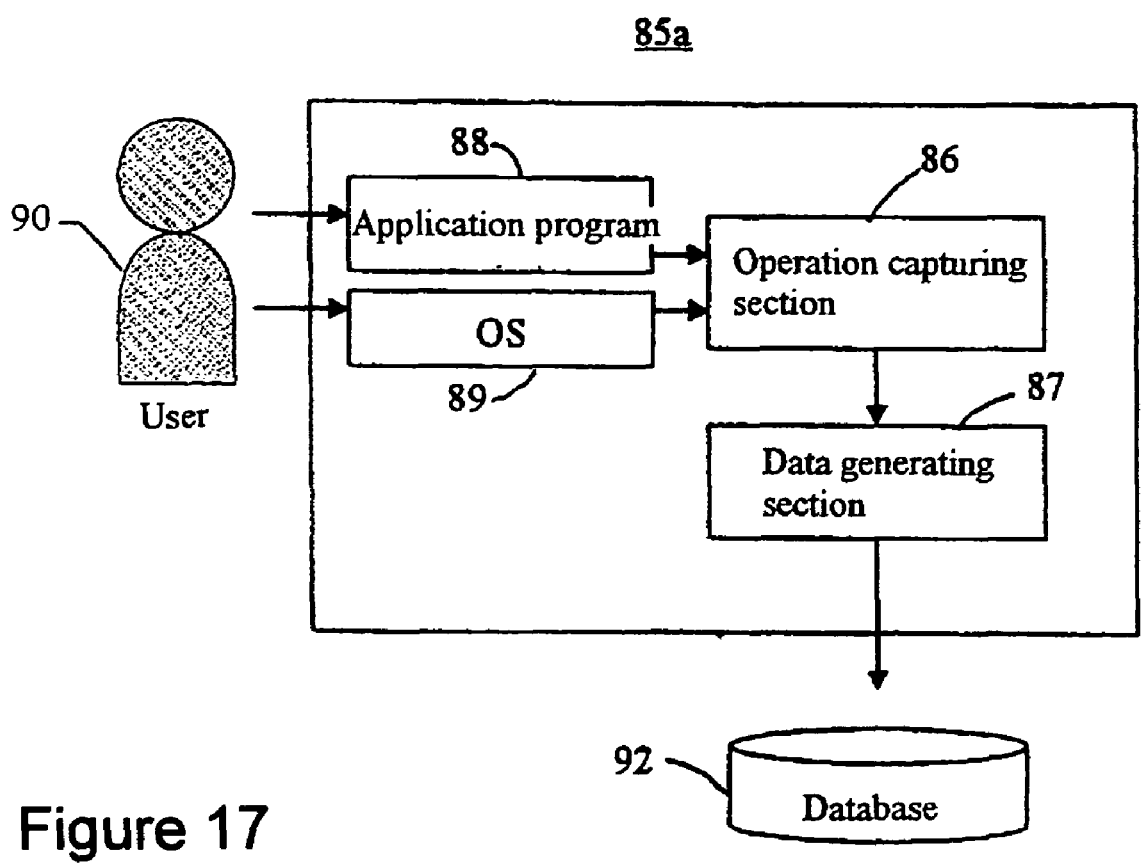
FIG. 17 illustrates a structural diagram showing a data-generating computer.

FIG. 17 is a structural diagram showing a data-generating computer 85a. The data-generating computer 85a is constituted of a user operation capturing section 86, a data generating section 87, an application 88, and an OS 89. The user operation capturing section 86 captures a user operation by monitoring a graphics interface (API) call, which is generated by an application triggered by an operation of a user 90, and an event message for the application. The captured contents include a drawing command concerning a graphics object, creating/deleting commands of the graphics object, and user operation information about a mouse, a key, a menu, and the like. The user operation capturing section 86 can capture all the operation contents of the user without exception. Alternatively the operation capturing section 86 captures only predetermined applications and graphics objects.

FIG. 8 shows a software hierarchical diagram of Microsoft Windows□ as a packaging example of the user operation capturing section 86. The user operation capturing section 86 is packaged as a user mode DLL (referred to as a Hook Driver 57) and is mapped in each application process space. The Hook Driver mapped in each application process corrects Import Address Table in all the modules of the address space of a process and performs an API hook included in USER32.DLL and GDI32.DLL. At the same time, the Hook Driver 57 requests the system to make a subclass of a window and enables the reception of a message for the window of an application program. Thus, it becomes possible to monitor an API call made by an application and the transmission of a message from the system to the application. The Hook Driver having captured an API call and the transmission of a message sends the kind of event and a parameter to the data generating section 87, which will be discussed later, to generate data.

The data generating section 87 shapes user operation information captured by the user operation capturing section 86 into a designated data format and records the data format in a database 92. An example of the data format generated by the data generating section 87 is described in FIG. 9, which shows data examples of a window creation event (CreateWindow), a window size/position change event (MoveWindow), a window title change event (SetText), a screen drawing command (DrawCmd), and an application start event (CreateProcess). Other than the illustrated data, a window deletion event, an off-screen buffer allocate/release event, a mouse operation event, a menu operation event, and so on are available.

As shown in FIG. 10, when data is recorded in the database 92, the data generating section 87 classifies the data for each process and each graphics object (window and off-screen buffer) and records the data, instead of simply adding generated data in temporal order. Further, in order to readily retrieve the contents of operations based on the creation pattern of a graphics object, the hash value and so on of a data string are registered as search keys accompanying the data.

In general, a typical window application performs the following operations:
1:Start application (CreateProcess)
2:Create Window (CreateWindow)
3:Set Window position (MoveWindow)
4:Set Window title (SetText)
5:Draw (DrawCmd)
6:Delete Window (DestroyWindow)
7:End Application (KillProcess)

For such an application, the data generating section 87 generates a data string like the process 1 of FIG. 10. Further, when a window has a child window, processing 2 to 6 may be nested. In this case, a data string like the process 2 of FIG. 10 is generated. Moreover, when a plurality of threads are created in a process and the threads manage separate windows, a data string like the process N of FIG. 10 is generated. FIG. 10 shows the simplest data pattern. In a general case, window size change data and redrawing command data are generated at any time in response to various operations performed by the user. However, when the same application is similarly executed in a different environment, completely the same data list is basically generated except for values such as a process ID, a window ID, window coordinates, and so on which depend upon an operating environment.

Hence, in the present embodiment, a hash value is generated from data only in a part independent from the environment, out of data strings generated by a series of operations ranging from the generation to disappearance of a graphics object. The hash value is registered as a search key in the database in association with operation command string data concerning the graphics object. To be specific, in the case of process 1 of FIG. 10, only values such as a process name, a window title, a class name, a style, and the order of creating windows are independent from the environment and are packed to calculate a hash value. The hash value is added to data. These values are data repeatedly reproduced in a similar manner even in a different environment, thereby generating an equal hash value. The hash value may be generated concurrently with data registration or may be subjected to post-processing in the background.

Illustrative Embodiment 2

Figure 18:
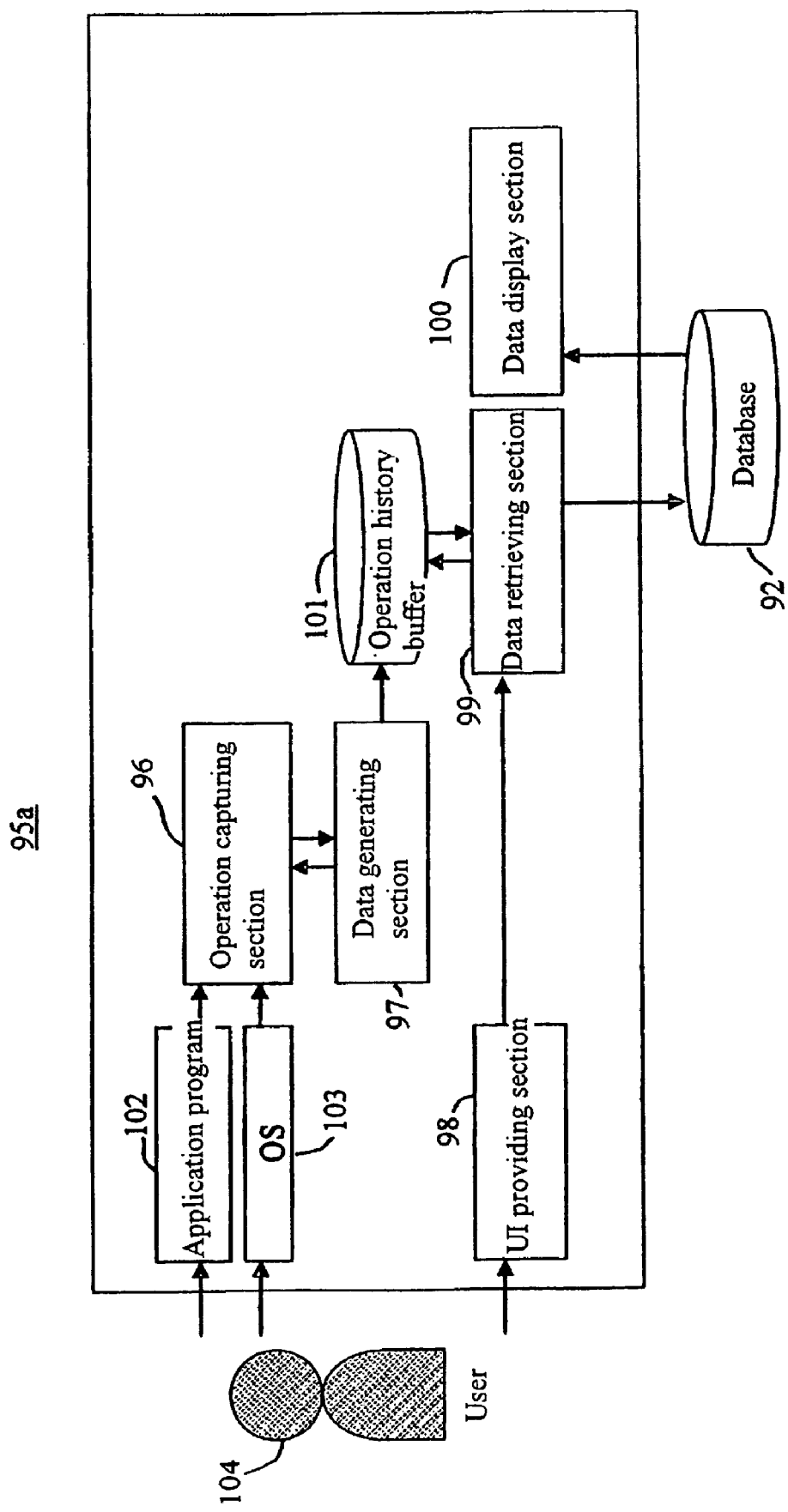
FIG. 18 illustrates a structural diagram showing a data reference computer.

FIG. 18 is a structural diagram showing a data reference computer 95a. The data reference computer 95a is constituted of a user operation capturing section 96, a data generating section 97, a user interface providing section 98, a data retrieving section 99, a data display section 100, an operation history buffer 101, an application 102, and an OS 103.

The functions of the user operation capturing section 96 and the data generating section 97 are respectively similar to those of the user operation capturing section 86 and the data generating section 87 of the data-generating computer 85a. The user operation capturing section 96 and the data generating section 97 manage the operation history of a user 104. The data generating section 97 accumulates user operation history data in the operation history buffer 101 disposed in the data reference computer 95a. The operation history data has the same format as data generated in the data-generating computer 85a and is used for searching a shared database 92 for a past similar operation example.

The interface providing section 98 provides the user 104 with an interface for a help request. To be specific, a button for a help request is added in the title bar of a setting dialogue box, or when a mouse cursor is moved close to the individual setting points of the dialogue box, the interface providing section 98 displays a window or menu for a help request. Alternatively, by monitoring key input, the user 104 is caused to perform a specific hot key operation. Further, a special hardware key such as Access IBM button of ThinkPad□ may be provided.

The data retrieving section 99 acquires operation history data concerning a target window (e.g. a window with a pressed button and an active window at that time) from the operation history buffer 101 when the user 104 makes a help request via the interface provided by the user interface providing section 98, and the data retrieving section 99 searches the database 92 for a past operation example assumed to be a similar operation. Upon searching, a hash value of data obtained by excluding values depending upon the environment is calculated from the generation pattern data of a graphics object and the database is searched for data having the same hash value, thereby achieving an efficient search.

The data display section 100 extracts the past operation example, which has been retrieved by the data retrieving section 99, from the database 92 and provides the operation example for the user 104. To be specific, the past operation example is reproduced in an animated manner or only the corresponding window is displayed as a static image. Further, a parameter example of an item on which the user 104 makes a help request may be displayed near the input point of the item. Moreover, when two or more past operation examples are available for the same operation, a setting example with a larger number of users is provided (majority rule) or the latest setting example of the user 104 is provided.

A specific example of retrieval will be discussed below by using actual data.

The symbol list A is obtained by shaping all graphics processing command list, which have been issued on the system when the setting operation of a DNS server is recorded, into a text format in the data-generating computer 85a. To avoid complexity, data not associated with retrieval is omitted that includes drawing data and mouse data. Measurements were performed in Microsoft Windows□ XP. In data associated with the setting window of the DNS server, line number 15 and line numbers 105 to 111 of the symbol string A are used for calculating a hash value.

On the other hand, data in the symbol string B is operation history data when the setting operation of the DNS server is similarly performed in the data reference computer 95a and the user 104 presses a help request button on a setting point of the DNS server. Line number 205 and line numbers 306 to 314 are data associated with the window and are used for calculating a hash value upon retrieval. As is understood from comparison with line number 15 and line numbers 105 to 111 of the symbol string A, reproduction is performed in completely the same manner except for values depending upon the environment such as a window handle, absolute coordinates of a top-level window and a process ID. Thus, symbol strings A and B generate equal hash values.

The above explanation described an example in which a hash value is calculated and a comparison is made. The present invention is not limited to this example and other methods may be used as long as matching operation example data is found.

Moreover, the method of generating a search key can be flexibly changed according to a situation. For example, in the above example, the target window is a dialogue box and thus the child windows have the same relative position and size all the time. If the target window is a top-level window changeable in size, the relative position and size of a sub-window may be changed according to a screen size and a window size. However, data used for calculating a search key does not always have to be the same kind but can be changed according to a window style. For example, the relative position and size of a sub-window are used to calculate a search key in a dialogue box but are not used for a window style with a changeable size.

Similarly the method of calculating a search key may be flexibly changed according to the needs of a person who retrieves data. For example, when a retrieval is performed so as to include a window title and a character string of a button, retrieval accuracy is generally improved. However, when data is shared by the English version and Japanese version of the same application program, character string information conversely becomes an obstacle. In this case, only a class name, the order of creating sub-windows, and a process name other than character string information should be used to calculate a search key.

According to the present embodiment, when a user has previously performed a similar operation in a group, another user in the group can perform his/her operation while referring to the operation contents having been performed by the preceding user. By applying the present embodiment to a small group such as a section of a company, it is possible to efficiently share information including a network setting and a printer setting, which are specific to the group, or a method of using an application program.

In the above embodiment, it was assumed that anyone in a group can generate data. Such an assumption is not always necessary. For example, the following usage pattern is available: only a system administrator of a section can generate operation data and record the data in a database and general users can only refer to a model setting example recorded in the database.

Moreover, a user interface may be provided to permit the user to select whether data should be registered or not during data generation. Besides, the data format used in the present invention can describe processing commands in symbol strings, thereby editing a drawing command. Thus, instead of directly recording operation history data in the database, the data may be buffered once in the data-generating computer and may be registered in the shared database after being edited and selected.

Illustrative Embodiment 3

Figure 19:
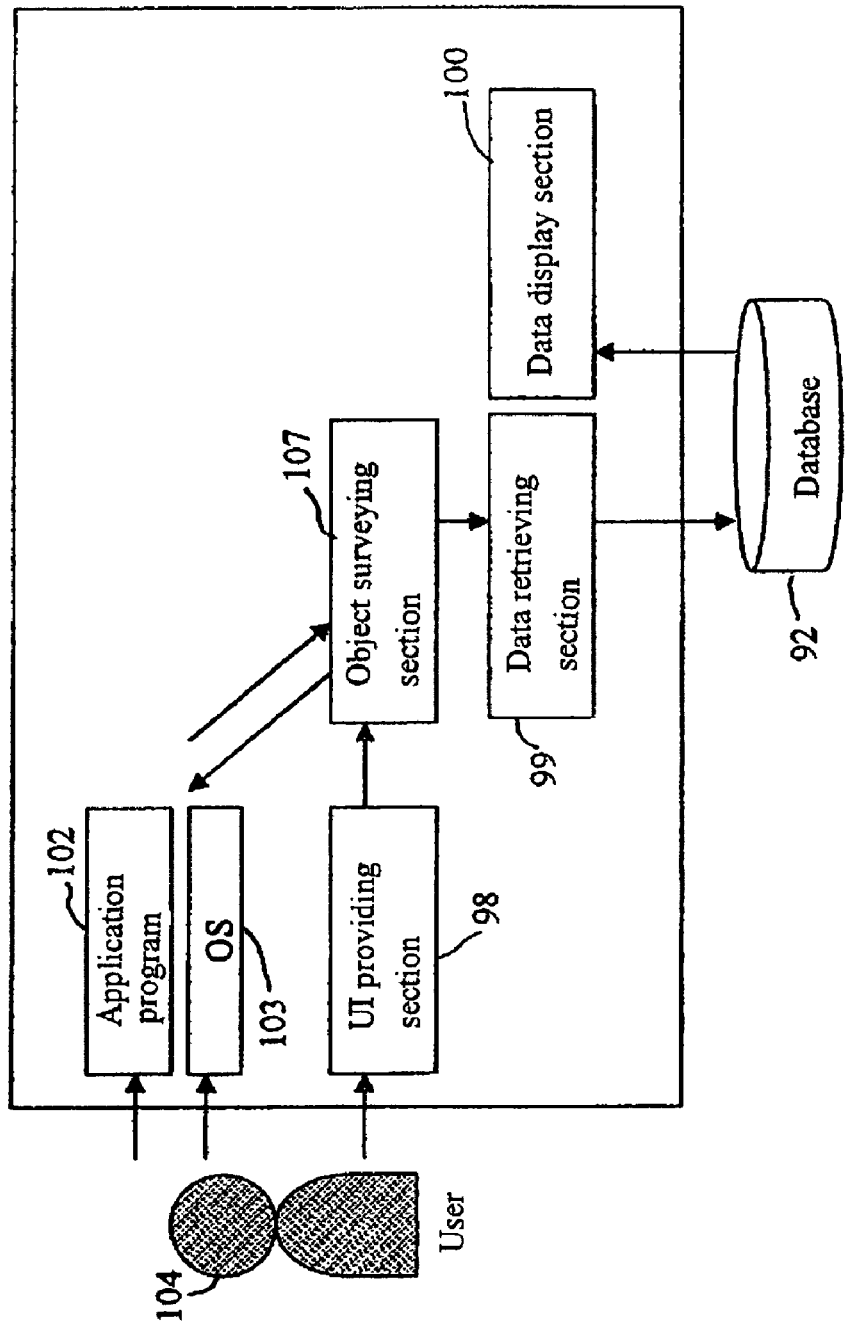
FIG. 19 illustrates a structural diagram showing another data reference computer.

FIG. 19 is a structural diagram showing another data reference computer 95b. The data reference computer 95b conducts a survey about the state of a graphics object when the user makes a help request, and the data reference computer 95b searches a database for a past similar operation example based on the information. The data reference computer 95b has the advantage of eliminating the necessity for keeping capturing an operation history with the data reference computer, instead of sacrificing retrieval accuracy to a degree.

The data reference computer 95b is different from the data reference computer 95a in that an object surveying section 107 is added in place of the user operation capturing section 96, the data generating section 97, and the operation history buffer 101.

When a user interface providing section 98 receives a help request from the user, the object surveying section 107 surveys the state of the graphics object of a target window at that time. To be specific, the object surveying section 107 acquires some kind of information enabling the identification of the window, the information including a window title of a target window, an aspect ratio, character strings in a window, the coordinates of buttons, and the number of sub-windows. This information can be acquired on demand even if state transitions are not sequentially captured.

When the object surveying section 107 acquires the identification information of the target window, a data retrieving section 99 is caused to search a database 92 for a past similar operation example. For example, when a window title is used as identification information, in data of the database, the data retrieving section 99 searches data including a window generating event with the same window title. Although text search may be directly performed, as in Illustrative Embodiment 1, a hash table may be prepared during data registration and a retrieval may be made with a hash key to achieve an efficient retrieval.

As compared with the data reference computer 95a, the data reference computer 95b does not track a generation pattern of an object and thus retrieval accuracy may decrease. For example, two or more pieces of data may be present for completely different application programs which generate windows with the same window title. Hence, when two or more different pieces of data are found in the first retrieval, for example, parent window information or process information is added, so that a recursive retrieval is made to increase retrieval accuracy.

Illustrative Embodiment 4

In Illustrative Embodiment 4, when the data reference computer refers to a past operation example, the data reference computer does not notify the user of operation contents but indicates information about another user having performed the operation. In Illustrative Embodiment 4, the user requesting help can find which user in a group has performed the same operation in the past, so that the user can efficiently find out a person to ask. This method is effective when a specific setting parameter in reference operation data should not be viewed by others.

Illustrative Embodiment 5

Figure 20:
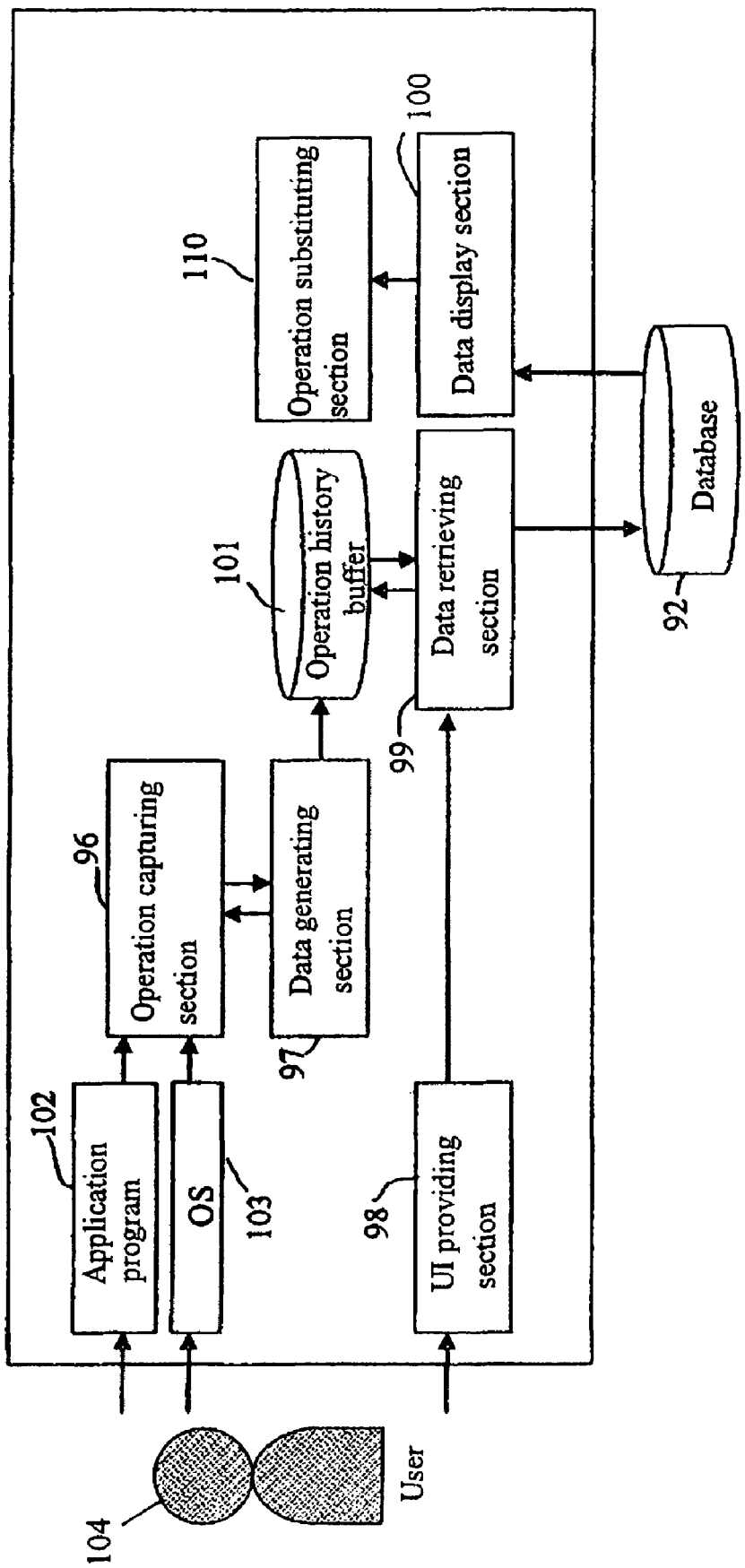
FIG. 20 illustrates a diagram showing still another data reference computer.

FIG. 20 shows a data reference computer 95c of the present embodiment. When the data reference computer 95c refers to past operation examples, the data reference computer 95c provides not only an operation example but also a function of automatically substituting for the user to perform the operation at the same time. The data reference computer 95c is different from the data reference computer 95a only in the addition of an operation substituting section 110.

In the data reference computer 95c, the operation substituting section 110 has the function of emulating a mouse operation, menu operation, and key input performed for the user, the data reference computer 95c automatically executes operation contents indicated in past operation example data acquired from a database.

Figure 21:
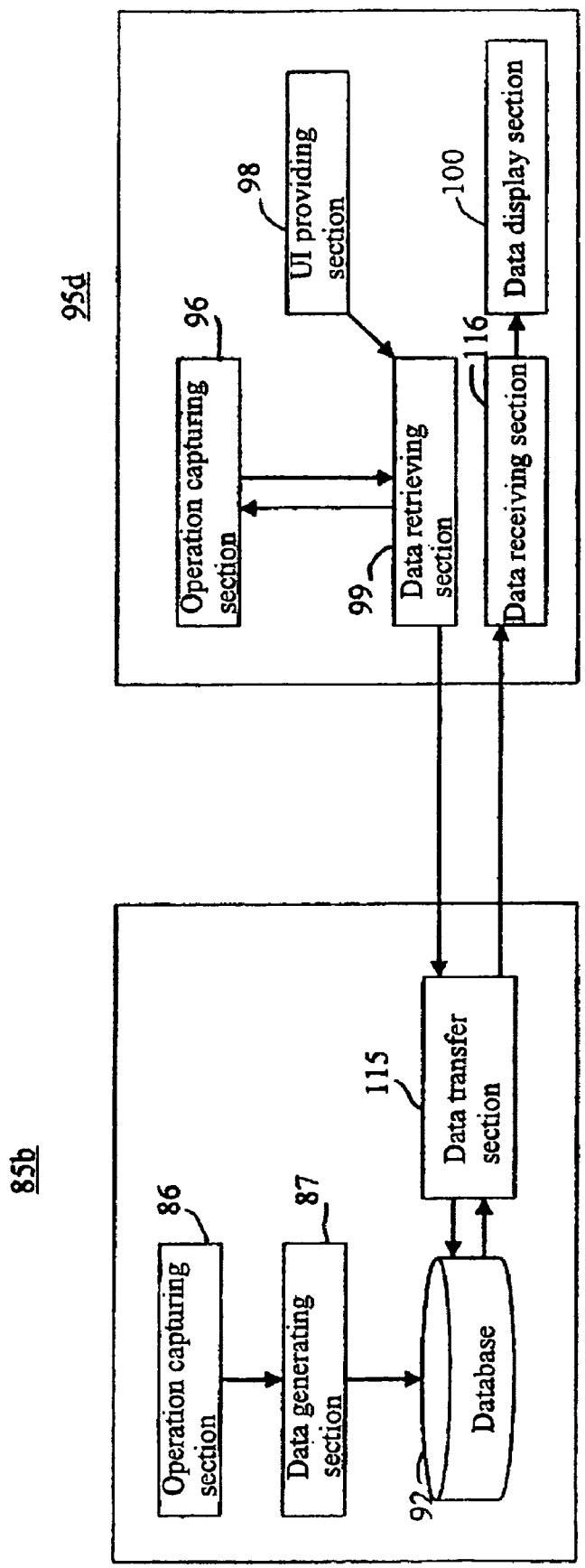
FIG. 21 illustrates an explanatory drawing showing another data reference computer directly requests a data-generating computer 85b to provide operation data.

FIG. 21 is an explanatory drawing showing the case where a data reference computer 95d directly requests a data-generating computer 85b to provide operation data. The data reference computer 95d does not access the database via a network. A database 92 is disposed in the data-generating computer 85b and the data reference computer 95d directly requests the data-generating computer 85b to provide operation data. It is assumed that the two computers 85b and 95d communicate with each other via infrared communication, a radio ad hoc network, and so on (not shown).

The data-generating computer 85b has the database 92 therein. Further, the data-generating computer 85b further comprises a data transfer section 115 which receives a transfer request and transfers data. Other configurations are similar to those of the data-generating computer 85a The data reference computer 95d further comprises a data receiving section 116 which receives data from the data transfer section 115 of the data-generating computer 85b. Other configurations are similar to those of the data reference computer 95a.

The present embodiment is suitable for a usage pattern in which operation contents are actually recorded on-site and are provided for the user of a reference computer, instead of orally providing instructions about a somewhat complicated operating method.

The present invention can achieve a user support system enabling the user to effectively set his/her computer while referring to a past operation example of another user who can share a setting parameter via a LAN and an infrared communication or an ad hoc network. The user is released from a complicated work for collecting each piece of guide information dispersed over a plurality of documents and can readily refer to past operation examples as if the user orally asked an adjacent user. Further, a system administrator and an application vendor can readily produce help documents according to respective usage environments, thereby remarkably reducing management and operation cost.

Illustrative Embodiment 6

Still another Illustrative Embodiment will be discussed below. When a plurality of setting parameters are selectable, the information using means 32 (FIG. 3) provides candidates in decreasing order of the number of users having made the same setting in the past or provides only a candidate having the largest number of users. When a plurality of setting parameters are selectable, the information using means 32 provides an example of an operation performed by a user who has made a setting most recently in the past. Information in the database 13 (FIG. 2) gradually increases with the passage of time, and the database 13 deletes data referred by just a few users and data having items frequently reset by the same user, as obsolete data.

According to the present invention, considering a graphics processing command to a graphics interface, information about completed work is registered in a database or the database is searched based on the graphics processing command. Therefore, a user who registers information can swiftly and efficiently register information about completed work in the database simply by performing usual operations without the necessity for a special operation for registering a work in the database. Further, when a user who retrieves information gets stuck in operations, a search key for properly retrieving information about completed work is suitably selected based on graphics processing commands acquired until the user gets stuck, thereby eliminating the necessity for the user to expend a long time and enormous manpower for selecting a proper key.

Further, when the present invention is used for a setting operation, the user makes the setting with usual operations without much concern for registration. When the setting is successfully completed, the contents of the setting operation are registered in the database as information about completed work. Therefore, unlike a method of causing a predetermined person in charge to register setting data in a database, the setting operation of a user who has completed a setting operation ahead of others is immediately registered in the database. Consequently, in spite of an enormous number of setting operations in the overall group, it is possible to bring forward the timings of release and usage of the setting operations.

The invention claimed is:

1. An information processing method for registering information about a setting operation of application software and a shared resource of an assigned group for completed work, comprising:

monitoring a series of graphics processing commands on a computer as the graphics processing commands are triggered by an operation of a user on a graphics interface wherein the monitoring is performed by a graphics interface call hook driver;

capturing the series of graphics processing commands to the graphics interface;

registering, as information about completed work in a database, information about the series of graphics processing commands concerning a previously completed work out of the captured graphics processing commands according to the graphics interface call hook driver, wherein during the generation of the graphics processing commands the user selects whether or not the information about the series of graphics commands should be registered;

registering different setting information for each user that completes a same specified one of the completed work; and registering names of computers used and names of each user for each registered setting regarding the specified one of the completed work;

surveying a state of graphics objects in an incomplete work for graphics information present in the incomplete work wherein the surveying is performed by an object surveying section;

creating a search key for retrieving previously completed work by using an order of creating sub-windows;

retrieving previously completed work performed by a plurality of users containing one or more of the graphics processing commands in the completed work that match graphics information in the incomplete work;

buffering operation history data regarding the retrieved work; and displaying on the computer results of the retrieved previously completed work that match graphics information in the incomplete work.

2. The method according to claim 1, wherein registering, as information about completed work in the database, further comprises:

extracting graphics processing commands of the same process from all the captured graphics processing commands and generating a first-level block including the extracted graphics processing commands, matching each of the first-level blocks with a piece of information about completed work and registering each piece of the information about completed work in the database, wherein names corresponding to the first-level and second-level blocks are elements of information about the completed work;

connecting in series a plurality of information about the completed work to form a string;

calculating a hash value corresponding to the string; and using an address corresponding to the hash value as the storage location of the first-level block.

3. The method according to claim 2, wherein the registering, as information about completed work in the database further comprises:

extracting graphics processing commands of the same object from one or more graphics processing commands belonging to the first-level block and generating a second-level block including the extracted graphics processing commands, and matching each of the first-level blocks with the piece of information about completed work, each piece of the information about completed work is registered in the database according to a data structure having the second-level block disposed in the first-level block as a sub-block of the first-level block, and the blocks have headers in which the size information and time stamp of the blocks are written.

4. The method according to claim 3, wherein the registering, as information about completed work in the database further comprises:

classifying a drawing command block, which serves as a second-level block, into third-level blocks each of which is grouped for each of a series of graphics processing commands generated for one event from an operating system, and in matching each of the first-level blocks with the piece of information about completed work, each piece of information about completed work is registered in the database according to a data structure in which regarding a plurality of drawing command blocks in the same first-level block, drawing command blocks including only similar third-order blocks are regarded as similar drawing command blocks, and regarding a plurality of similar drawing command blocks, a second drawing command block and later are regarded as simplified blocks whose contents are omitted by indicating that the contents are similar to those of a first drawing command block.

5. The method according to claim 4, further comprising:

detecting a work in progress using one of the captured series of graphics processing commands;

identifying a preceding work based on the captured graphics processing command;

searching the database for information about the preceding work based on the captured graphics processing command and acquiring said information; and using the acquired information about preceding work for the work in progress.

6. The method for according to claim 5, wherein the step of using the acquired information comprises:

a sub-step of displaying a setting data of information about completed work as a static image, a sub-step of automatically executing the preceding work based on the setting data of information about completed work, and a sub-step of displaying as a moving image a flow of user setting of a setting operation, the information about completed work being based on the setting operation.

7. The method for according to claim 5, wherein in the step of searching the database, a user operation of the preceding work is detected from the graphics processing command captured in capturing a graphics processing command to a graphics interface from started application software and information about completed work about the preceding work is retrieved based on the detected work in progress.

8. The method according to claim 5, wherein the database has information about completed work as a first-level block including graphics processing commands of the same process, and in searching the database for information about the work in progress, information about completed work is acquired as a single first-level block from the database.

9. The method according to claim 8, wherein the information about completed work in the database is configured so that graphics processing commands for the same drawing target object are extracted from one or more graphics processing commands belonging to a first-level block, a second-level block including the extracted graphics processing commands is generated, and the second-level block is disposed in the first-level block as a sub-block of the first-level block, and in searching the database for information about the work in progress, information about completed work is acquired from the database as a single first-level block including a plurality of second-level blocks.

10. The method according to claim 9, wherein the information about completed work in the database has a data structure in which an inside of a drawing command block serving as a second-level block is classified into three-order blocks, each of which is grouped for each of a series of graphics processing commands generated for one event from the operating system, regarding a plurality of drawing command blocks in the same first-level block, drawing command blocks including only similar third-order blocks are regarded as similar drawing command blocks, and regarding a plurality of similar drawing command blocks, a second drawing command block and later are regarded as simplified blocks whose contents are omitted by indicating that the contents are similar to those of a first drawing command block, and in searching the database for information about the work in progress, information about completed work is acquired from the database as a single first-level block including the simplified block.

11. An information processing method for information retrieval of a setting operation of one of an application software and a shared resource of an assigned group, said method when performed on a computer comprising:

detecting information about a graphics object in a target window of a work in progress which concerns a user request for information about completed work of a preceding work from one or more users, wherein the detecting is performed by a graphics interface call hook driver;

processing help requests from the user by acquiring an operation history data concerning the target window from an operation history buffer, wherein the processing is performed by the graphics interface call hook driver;

automatically retrieving information about the preceding work when one of the users is stuck in a predetermined work;

searching a database of completed work for past operation examples of the graphics object;

selecting by one of the users which of previously registered settings for the completed work to use during the user's completion of the work;

selecting by one of the users one of the previously registered settings based on a preferred user attached to the previously registered setting;

obtaining a hash value of data by excluding values depending upon an environment associated with the target window in the work in progress, wherein the hash value of data is generated in background postprocessing;

calculating a generation pattern data of the graphics object using the hash value;

searching the database for data in preceding works having the same hash value calculated for the graphics object;

providing a candidate preceding work based on a largest number of users associated with a completed work of the graphics object; and using the data in completed work having the same hash value calculated for the graphics object for use in the graphics object of the work in progress.

12. An information processing system, comprising:

capturing means for capturing graphics interface commands from running application software;

registration determination means for receiving input from a user regarding whether to register information about completed work;

registration means that registers different setting information for each user that completes a same specified one of the completed work;

selecting means that selects by each user which of previously registered settings for the completed work to use during the user's completion of the work;

database registering means for registering the information about completed work and information about a series of graphics processing commands concerning a completed work out of the captured graphics processing commands;

a graphics interface call hook driver for capturing a graphics processing command to a graphics interface from started application software;

a surveying section for detecting a work in progress as a proceeding work based on the captured graphics processing command; information acquiring means which searches a database for information about the work in progress which has been done before based on a graphics processing command concerning the proceeding work and acquires the information about the work in progress which has been done before;

creating a user support system with on-site recordings of usage patterns;

automatically setting a user computer to setting information about the work in progress which has been done before; and information using means for using the information about completed work, which has been acquired by the information acquiring means, for the proceeding work, wherein the information using means provides candidate setting parameters in decreasing order based on a number of users that made the setting parameters in the past.

13. An information processor for information registration, comprising:

capturing means for capturing a graphics processing command to a graphics interface on a computer from started application software;

selecting a window style;

search means for searching for information about completed work using a search key wherein the search key is generated based on the selected window style;

database registering means for registering, as information about the completed work in a database, information about a series of graphics processing commands concerning a completed work out of the captured graphics processing commands, wherein multiple different settings are accepted for registration for a same group of users; and registering means that registers names of computers used and names of each user for each registered setting regarding a specified one of the completed work;

selecting means that selects by a user one of previously registered settings based on a preferred user attached to the previously registered setting;

an information using means for displaying, on a computer display, a list of completed works associated with the graphics processing command.

14. The information processor for information registration according to claim 13, wherein the work is a setting operation of application software and/or a shared resource of an assigned group.

15. The information processor for information registration according to claim 13, wherein the database registering means comprises:

first-level block generating means which extracts graphics processing commands of the same process from all the captured graphics processing commands and generates a first-level block including the extracted graphics processing commands, and block registering means which matches each of the first-level blocks with a piece of information about completed work and registers each piece of the information about completed work in the database.

16. The information processor for information registration according to claim 15, wherein the database registering means comprises:

second-level block generating means which extracts graphics processing commands of the same object from one or more graphics processing commands belonging to the first-level block and generates a second-level block including the extracted graphics processing commands, and structurally registering means which registers each piece of the information about completed work in the database according to a data structure having the second-level block disposed in the first-level block as a sub-block of the first-level block.

17. The information processor for information registration according to claim 16, wherein the database registering means comprises: drawing command block generating means which classifies a drawing command block, which serves as the second-level block, into third-level blocks each of which is grouped for each of a series of graphics processing commands generated for one event from an operating system, and the structurally registering means which registers each piece of information about completed work in the database according to a data structure in which multiple drawing command blocks in the same first-level block, drawing command blocks including only similar third-order blocks are regarded as similar drawing command blocks, and regarding a plurality of similar drawing command blocks, a second drawing command block and later are regarded as simplified blocks whose contents are omitted by indicating that the contents are similar to those of a first drawing command block.

18. The information processor for information registration according to claim 13, wherein the information about completed work is composed of a symbol string in which each processing command is expressed by a programming language, and the information processor further comprises editing means which enables a user to edit the symbol string of the information about completed work.

19. An information processor for information retrieval, comprising:

capturing means for capturing a graphics processing command to a graphics interface of a computer from started application software;

registration determination means for receiving input from a user regarding whether to register information about completed work;

registration means that registers different setting information for each user that completes a same specified one of the completed work;

registration means that registers names of computers used and names of each user for each registered setting regarding the specified one of the completed work;

proceeding work detecting means for detecting a work in progress as a proceeding work based on the captured graphics processing command;

information acquiring means which searches the database for information about the work in progress which has been done before based on a graphics processing command concerning the proceeding work and acquires the information about the work in progress which has been done before, wherein when two or more different pieces of data are found in a first retrieval, parent process information is registered and added to the information about the work in progress, wherein the retrieval is performed in a recursive manner; and information using means for using the information about completed work, which has been acquired by the information acquiring means, for the proceeding work wherein the information using means provides a plurality of selectable parameters.

20. The information processor for information retrieval according to claim 19, characterized in that the work is a setting operation of application software and/or a shared resource of an assigned group.

21. The information processor for information retrieval according to claim 19, wherein the information using means comprises:

static image display means for displaying setting data of information about completed work as a static image, automatic executing means for automatically executing a proceeding work based on the setting data of information about completed work, or moving image generating means for displaying as a moving image a flow of user setting of a setting operation, the information about completed work being based on the setting operation.

22. The information processor for information retrieval according to claim 19, wherein the information acquiring means detects a user operation of a proceeding work from the graphics processing command captured by the capturing means and retrieves the information about completed work about the proceeding work based on the detected user operation.

23. The information processor for information retrieval according to claim 19, wherein the database has information about completed work as a first-level block including graphics processing commands of the same process; and the information acquiring means acquires information about completed work about a proceeding work as a single first-level block from the database.

24. The information processor for information retrieval according to claim 23, wherein the information about completed work in the database is configured so that graphics processing commands for the same drawing target object are extracted from one or more graphics processing commands belonging to the first-level block, a second-level block including the extracted graphics processing commands is generated, and the second-level block is disposed in the first-level block as a sub-block of the first-level block, and the information acquiring means acquires, from the database, information about completed work about a proceeding work as a single first-level block including a plurality of second-level blocks.

25. The information processor for information retrieval according to claim 24, wherein the information about completed work in the database has a data structure in which an inside of a drawing command block serving as a second-level block is classified into three-order blocks, each of which is grouped for each of a series of graphics processing commands generated for one event from the operating system, regarding a plurality of drawing command blocks in the same first-level block, drawing command blocks including only similar third-order blocks are regarded as similar drawing command blocks, and regarding a plurality of similar drawing command blocks, a second drawing command block and later are regarded as simplified blocks whose contents are omitted by indicating that the contents are similar to those of a first drawing command block, and the information acquiring means acquires, from the database, information about completed work about a proceeding work as a single first-level block including the simplified block.

26. An information processor for information retrieval, comprising:

graphics object information detecting means for detecting information about a graphics object on a computer, wherein the detected information concerns a user request for information about completed work from a user;

search means for detecting the information about completed work by calculating a search key based on position and size of a sub-window;

selecting means that selects by one of the users which of previously registered settings for the completed work to use during the user's completion of the work;

selecting means that selects by one of the users one of the previously registered settings based on a preferred user attached to the previously registered setting;

information acquiring means which searches a database based on a detected object for information about completed work and acquires the information about the information about completed work; and information using means for using the information about completed work, which has been acquired by the information acquiring means to identify on the computer, another user having worked on the graphics object, wherein information about users who initially performed the registration of the information about completed work is displayed and registered.

* * * * *